United States Patent [19]

Sawamoto et al.

[11] Patent Number: 4,841,048
[45] Date of Patent: Jun. 20, 1989

[54] DIOXAZINE COMPOUND HAVING VINYLSULFONE TYPE FIBER REACTIVE GROUP

[75] Inventors: Hirokazu Sawamoto, Minoo; Takashi Omura, Ashiya; Naoki Harada, Suita, all of Japan

[73] Assignee: Sumitomo Chemical Company, Limited, Osaka, Japan

[21] Appl. No.: 125,745

[22] Filed: Nov. 19, 1987

Related U.S. Application Data

[63] Continuation of Ser. No. 12,177, Feb. 9, 1987, abandoned.

[30] Foreign Application Priority Data

Feb. 17, 1986 [JP] Japan .................................. 61-32645

[51] Int. Cl.$^4$ ............................................ C07D 265/34
[52] U.S. Cl. ............................................................ 544/74
[58] Field of Search ............................................. 544/74

[56] References Cited

U.S. PATENT DOCUMENTS

| | | | |
|---|---|---|---|
| 4,400,504 | 8/1983 | Harms et al. ..................... | 544/74 X |
| 4,607,102 | 8/1986 | Nishikuri et al. .................. | 544/74 |
| 4,629,788 | 12/1986 | Jäger ................................ | 544/74 |

FOREIGN PATENT DOCUMENTS

| | | |
|---|---|---|
| 0141996 | 5/1985 | European Pat. Off. . |
| 0158857 | 10/1985 | European Pat. Off. . |
| 1265698 | 11/1968 | Fed. Rep. of Germany . |

*Primary Examiner*—Richard L. Raymond
*Attorney, Agent, or Firm*—Stevens, Davis, Miller & Mosher

[57] ABSTRACT

A dioxazine compound of the formula,

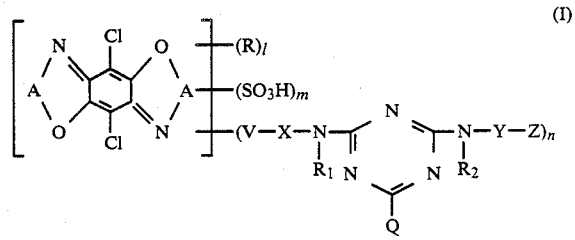

wherein A is a divalent group of the formula,

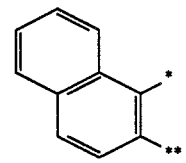

in which * and ** denote linkages to the adjacent nitrogen and oxygen atoms, respectively, or the divalent group-containing 3- to 5-condensed aromatic ring residue, R is a substituent such as amino, cyano, nitro, halogeno and the like, V is $-SO_2NR_5-$ or the like in which $R_5$ is hydrogen or the like, X is aliphatic, alicyclic, araliphatic or aromatic divalent group, Y is phenylene or naphthylene, Z is $-SO_2CH=CH_2$ or $-SO_2CH_2CH_2Z_1$ in which $Z_1$ is a splittable group, Q is halogeno, amino or the like, $R_1$ and $R_2$ are each hydrogen or alkyl, and $0 < l+m+n \leq 6$, provided that $0 \leq l \leq 4$, $0 \leq m < 5$ and $0 < n \leq 4$, which is useful for dyeing or printing hydroxyl or amide group-containing materials to give dyed or printed products of excellent fastness properties with good dye performances such as dyeing velocity, level dyeing property and build-up property.

6 Claims, No Drawings

DIOXAZINE COMPOUND HAVING VINYLSULFONE TYPE FIBER REACTIVE GROUP

This application is a Continuation of application Ser. No. 012,177, filed Feb. 9, 1987, now abandoned.

The present invention relates to a dioxazine compound, a process for producing the same and a process for dyeing or printing hydroxyl or amide group-containing materials using the same. More specifically, the present invention relates to a dioxazine compound having a vinylsulfone type fiber reactive group, which is useful for dyeing or printing said materials, particularly such as cellulose fiber, natural or synthetic polyamide fiber, polyurethane fiber, leather and the like to obtain dyed or printed materials excellent in fastness properties such as light fastness, wet fastness, chlorine fastness and the like.

Different kinds of dioxazine fiber reactive dyes are known and used for dyeing or printing above said materials. However, they are waiting for improvement with respect to dye performances such as dyeing velocity, level dyeing property and build-up property as well as fastness properties of the dyed or printed materials, particularly in an application to hydroxyl group-containing materials such as cellulose fiber.

The present inventors have undertaken extensive studies to find a dioxazine compound meeting needs described above, and as a result found that the object can be accomplished by providing a fiber reactive dioxazine compound having a specific molecular construction.

The present invention provides a dioxazine compound represented by the following formula (I) in a free acid form,

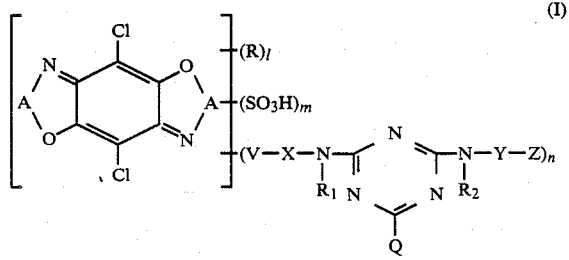

wherein A is aromatic ring residue having the following formula (II),

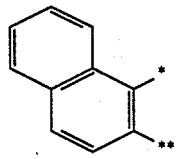

in which * and ** denote linkages to the adjacent nitrogen and oxygen atoms, respectively, or three-, four- or five-condensed aromatic ring residue having in part the aromatic ring residue of the formula (II), R or Rs is or are independently amino, cyano, nitro, halogeno, lower alkyl, lower alkoxy, aryloxy, aryl, acylamino, unsubstituted or substituted lower alkylamino, unsubstituted or substituted arylamino or —SO$_2$NR$_3$R$_4$ in which R$_3$ and R$_4$ are independently hydrogen, cyano, unsubstituted or substituted lower alkyl or unsubstituted or substituted aryl, V is direct linkage, —SO$_2$NR$_5$— or —NR$_6$— in which R$_5$ and R$_6$ are independently hydrogen or unsubstituted or substituted lower alkyl, X is direct linkage or aliphatic, alicyclic, araliphatic or aromatic divalent group, Y is unsubstituted or substituted phenylene or unsubstituted or substituted naphthylene, Z is —SO$_2$CH=CH$_2$ or —SO$_2$CH$_2$CH$_2$Z$_1$ in which Z$_1$ is a splittable group by the action of an alkali, Q is sulfo, hydroxy, halogeno, lower alkoxy, unsubstituted or substituted phenoxy or unsubstituted or substituted amino, R$_1$ is hydrogen or unsubstituted or substituted lower alkyl, or when X is direct linkage and V is the —SO$_2$NR$_5$—, R$_1$ and R$_5$ may form a ring taken together with each adjacent nitrogen, R$_2$ is hydrogen or unsubstituted or substituted alkyl, and l, m and n satisfy the following formula, $$0 < l + m + n \leq 6,$$

provided that l, m and n each is defined as follows, $0 \leq l \leq 4$, $0 \leq m \leq 5$ and $0 < n \leq 4$, and a process for producing the dioxazine compound of the formula (I), which comprises subjecting an intermediate dioxazine compound represented by the following formula (III) in a free acid form,

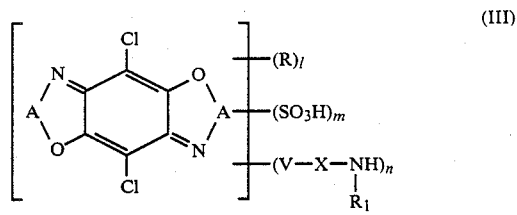

wherein A, R, R$_1$, V, X, l, m and n are as defined above, and an aromatic amine compound represented by the following formula (IV),

wherein R$_2$, Y and Z are as defined above, with or without a compound represented by the following formula (V),

wherein Q' is sulfo, hydroxyl, lower alkoxy, unsubstituted or substituted phenoxy or unsubstituted or substituted amino, to condensation reactions in order with a 1, 3, 5-trihalogeno-s-triazine to obtain the dioxazine compound having halogeno as Q in the formula (I) when the compound of the formula (V) is not subjected to the condensation, or having sulfo, hydroxyl, lower alkoxy, phenoxy or amino as Q when the compound of the formula (V) is subjected to the condensation.

The present invention also provides a process for dyeing or printing hydroxyl or amide group-containing materials comprising using the dioxazine compound of the formula (I).

Examples of dioxazines in a brace of the formula (I) are as follows:

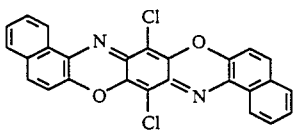

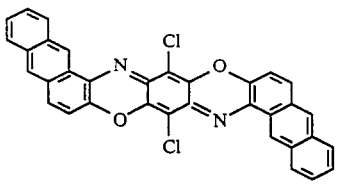

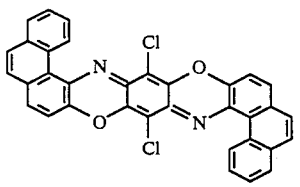

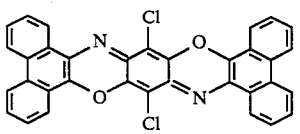

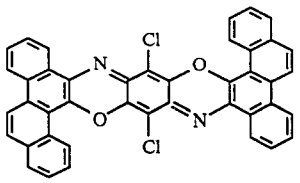

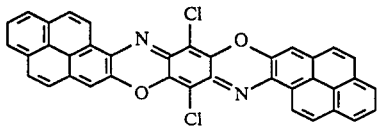

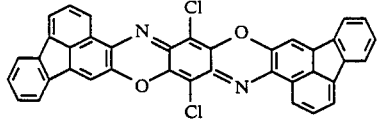

With respect to the divalent group represented by X, the aromatic divalent group may have at least one substituent such as sulfo, carboxy, methyl, methoxy or unsubstituted or substituted phenyl. Examples thereof are as follows:

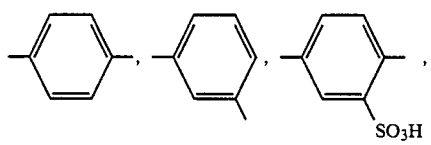

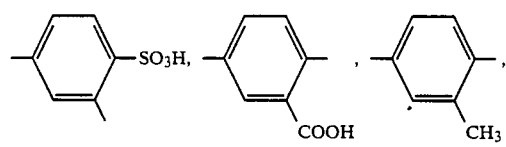

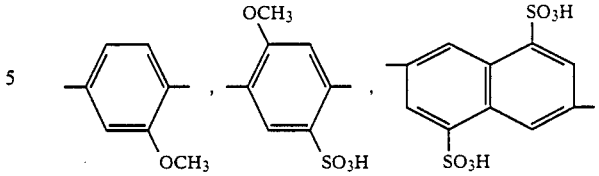

The araliphatic divalent group may have a hetero atom, and examples thereof are as follows:

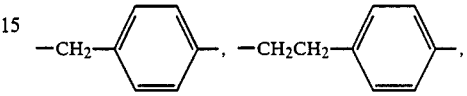

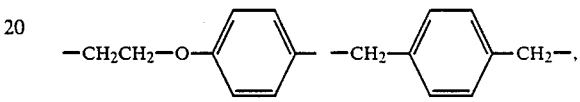

The phenylene of the above examples may have at least one substituent such as sulfo, carboxy, methyl, methoxy or unsubstituted or substituted phenyl.

The aliphatic or alicyclic divalent group may have a hetero atom and/or at least one substituent such as sulfo, carboxy, methyl, methoxy or unsubstituted or substituted phenyl, and examples thereof are as follows:

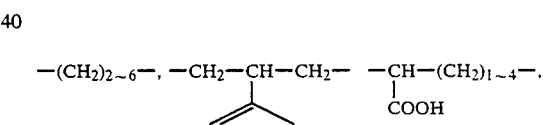

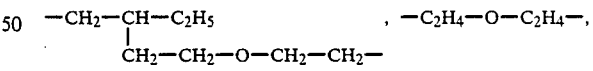

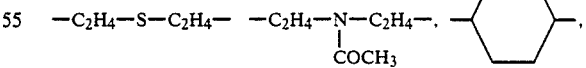

When X in the formula (I) is a direct linkage and V is $-SO_2NR_5-$, $R_1$ and $R_5$ may form a ring taken together with each adjacent nitrogen atom. Examples of the ring formed are

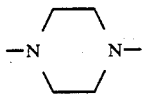

and the like.

With respect to the symbol Q, the halogeno includes chloro and fluoro. The phenoxy may be unsubstituted or substituted with one or two members preferably selected from methyl, ethyl, methoxy, chlorine, bromine, sulfo and carboxy. The amino includes unsubstituted amino, alkylamino, cycloalkylamino, aralkylamino, arylamino and N,N-disubstituted amino such as N,N-dialkylamino, N-alkyl-N-cyoalkyl and N-alkyl-N-arylamino, as well as heterocyclic ring-containing amino which heterocyclic ring may be further addition-condensed with a homocyclic ring, and N-heterocyclic ring-constituting amino which may contain additional hetero atoms (in the present invention, the term "N-heterocyclic ring-constituting amino" is intended to mean such that the nitrogen atom of the amino is a member forming a heterocyclic ring).

In the above definition with respect to the amino, the alkyl is a straight or branched one preferably having 1 to 4 carbon atoms, and preferable examples of the cycloalkyl, aralkyl and aryl are cyclohexyl, benzyl, phenethyl, phenyl and naphthyl, respectively. Examples of the heterocyclic ring are furan, thiophene, pyrazole, pyridine, pirimidine, quinoline, benzimidazol, benzthiazol and benzoxazol. The N-heterocyclic ring-constituting amino is preferably a six-membered ring which may contain additional hetero atoms such as nitrogen, oxygen and sulphur. The above-mentioned alkyl, cycloalkyl, aralkyl, aryl, heterocyclic ring and N-heterocyclic ring may be unsubstituted or substituted with halogen, nitro, cyano, trifluoromethyl, sulfamoyl, carbamoyl, $C_1$–$C_4$ alkyl, $C_1$–$C_4$ alkoxy, acylamino, ureido, hydroxyl, carboxyl, suflomethyl and/or sulfo.

Of these unsubstituted or substituted amino groups, particularly preferred are arylamino represented by the following formulae,

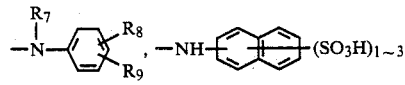

wherein $R_7$ is hydrogen, methyl or ethyl, $R_8$ and $R_9$ are independently hydrogen, chloro, sulfo, carboxy, methyl, methoxy or ethoxy.

Preferable examples of the amino represented by Q are —$NH_2$, methylamino, ethylamino, propylamino, butylamino, hexylamino, β-methoxyethylamino, β-ethoxyethylamino, γ-methoxypropylamino, N,N-dimethylamino, N,N-diethylamino, β-chloroethylamino, β-cyanoethylamino, N,N-di-β-hydroxyethylamino, β-hydroxyethylamino, γ-hydroxypropylamino, β-sulfoethylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxyl-4-sulfophenylamino, 2-methoxy-5-sulfophenylamino, 2-methyl-5-sulfophenylamino, 4-sulfonaphthyl-(1)-amino, 3,6-disulfonaphthyl-(1)-amino, 3,6,8-trisulfonaphthyl-(1)-amino, 4,6,8-trisulfonaphthyl-(1)-amino, 6-sulfonaphthyl-(2)-amino, 4,8-disulfonaphthyl-(2)-amino, 3,6,8-trisulfonaphthyl-(2)-amino, 4,6,8-trisulfonaphthyl-(2)-amino, pyridyl-(2)-amino, morpholino, piperidino, piperazino, ethanolamino, methanolamino, N,N-diethanolamino, N,N-dimethanolamino, N-ethanol-N-methylamino and N-ethyl-N-methanolamino.

Of these substituents Q, particularly preferred are methoxy, phenoxy, mono- or di-sulfophenoxy, or unsubstituted or substituted amino, particularly arylamino represented by the formulae,

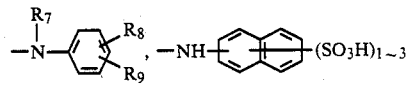

wherein $R_7$, $R_8$ and $R_9$ are as defined above.

The phenylene represented by Y may be unsubstituted or substituted with one or two members preferably selected from methyl, ethyl, methoxy, ethoxy chlorine, bromine and sulfo, and the naphthylene represented by that symbol may be unsubstituted or substituted with one sulfo. Preferred examples thereof are as follows:

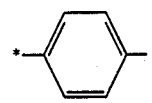

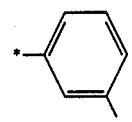

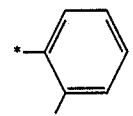

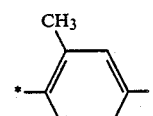

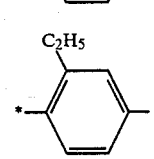

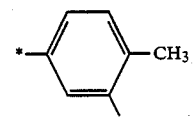

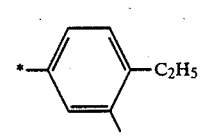

-continued

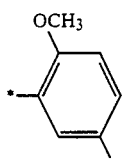

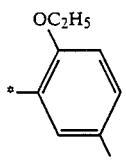

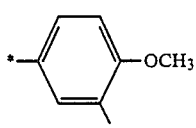

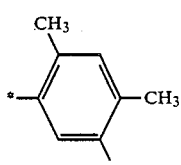

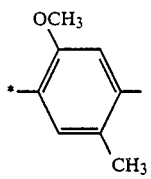

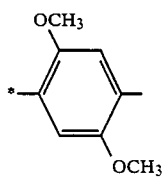

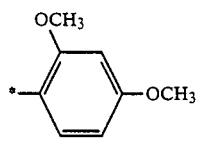

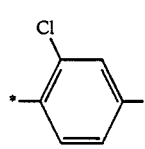

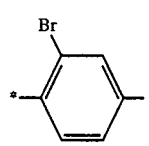

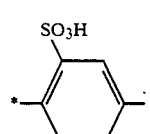

-continued

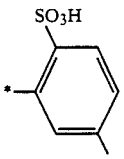

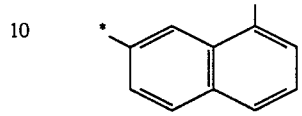

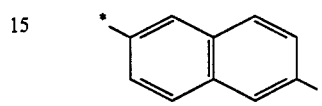

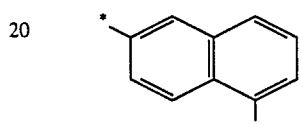

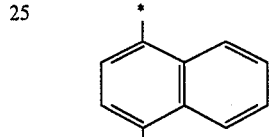

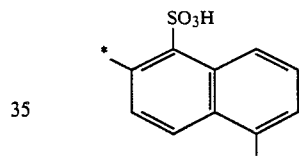

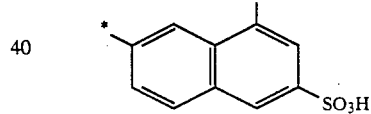

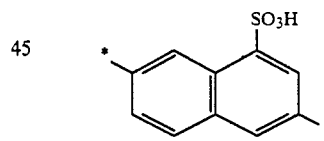

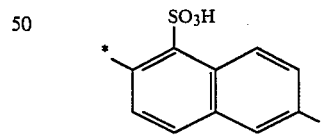

(In the formulae, the asterisked linkage is bonded to the group —NR$_2$—.)

The group splittable by the action of an alkali includes, for example, sulfuric acid ester group, thiosulfuric acid ester group, phosphoric acid ester group, acetic acid ester group, halogen atom and the like. Of these, particularly preferred are sulfuric acid ester group.

The lower alkyl represented by R$_1$, R$_2$, R$_3$, R$_4$, R$_5$ or R$_6$ is preferably one having 1 to 4 carbon atoms, and unsubstituted or substituted with hydroxyl, cyano, alkoxy, halogen, carboxy, carbamoyl, alkoxycarbonyl, alkylcarbonyloxy, sulfo or sulfamoyl. Preferred examples of the lower alkyl are methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 2-sulfopropyl, sulfamoylmethyl, 2-sulfamoylethyl, 3-sulfamoylpropyl, 4-sulfamoylbutyl and the like.

Among these dioxazine compounds in accordance with the present invention, particularly preferred are those having as the aromatic ring residue A a member selected from

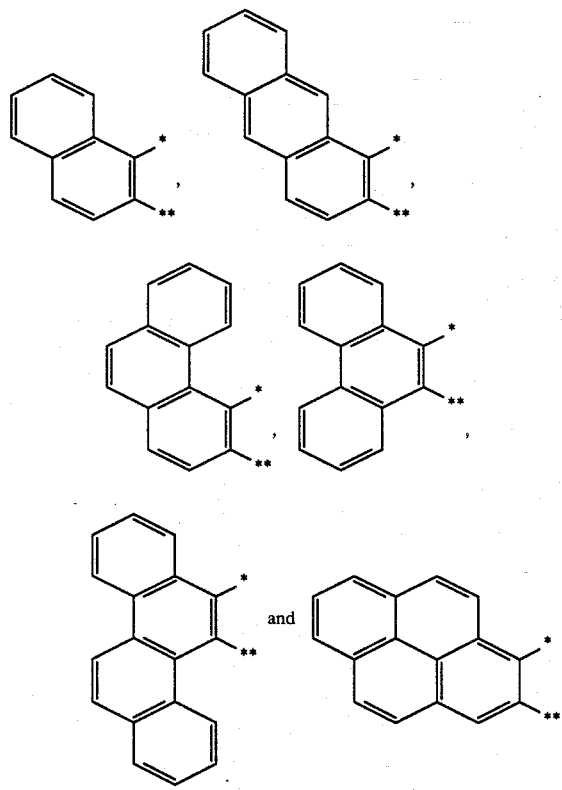

wherein * and ** are as defined above, and as $R_2$ $C_1$–$C_4$ alkyl unsubstituted or substituted with hydroxy, carbamoyl and the like, particularly when Q is halogeno.

The dioxazine compound of the formula (I) may be in the form of a free acid or a salt of an alkali metal or alkaline earth metal. Of these metal salts, preferred are sodium, potassium and lithium salts.

The dioxazine compound of the formula (I) can be produced in the following manner.

The intermediate dioxazine compound of the formula (III) and the amine compound of the formula (IV) together with or without the compound of the formula (V) can be subjected to condensation reactions in order with a 1,3,5-trihalogeno-s-triazine, thereby obtaining the desired dioxazine compound of the formula (I). Although any of the condensation reactions can be carried out under optional reaction conditions and the order of the condensation reactions is not limited, the first condensation can be preferably carried out at a temperature of −10° to 40° C. and at a pH ranging from 2 to 9, and the second condensation at a temperature of 0° to 70° C. and at a pH ranging from 2 to 9. When the compound of the formula (V) is used in compliance with request, the third condensation can be preferably carried out at a temperature of 10° to 100° C. and at a pH ranging from 2 to 7. The order of the condensation reactions can be determined preferably in such a manner that any compound having the lowest reactivity to the 1,3,5-trihalogeno-s-triazine is subjected to first condensation reaction.

The intermediate dioxazine compound of the formula (III) can be readily prepared in a convention manner, for example, in the following manner.

An amine compound of the following formula (VI),

A′—NH₂                                      (VI)

wherein A′ denotes α-naphthyl moiety or the α-naphthyl moiety-containing 3- to 5-condensed ring moiety, both moieties being unsubstituted or substituted with sulfo and/or those represented by R not including —SO₂NR₃R₄, is subjected to condensation with chloranil, forming a dianilide compound of the following formula (VII),

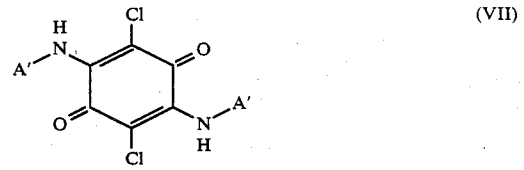

wherein A′ is as defined above. Successively, the dianilide compound is subjected to ring closure in a conventional manner, obtaining the desired intermediate dioxazine compound. If necessary, the resulting intermediate compound is further subjected to chlorosulfonylation, followed by condensation with a compound of the following formula (VIII),

R₁HN—X—NHR₅                                 (VIII)

wherein R₁, R₅ and X are as defined above, obtaining the desired intermediate dioxazine compound of the following formula (IX),

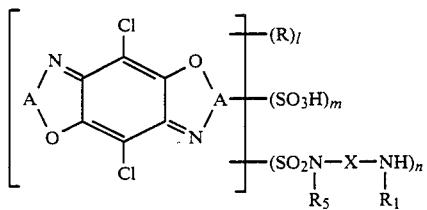

(IX)

wherein A, R, $R_1$, $R_5$, X, l, m and n are as defined above, the condensation being carried out, if desired, in the presence of ammonia, an unsubstituted or substituted lower alkylamine or an unsubstituted or substituted arylamine.

Alternatively, the intermediate dioxazine compound of the formula (III) can be prepared using the amine of the formula (VI) having as A' the moiety substituted with those capable of condensing with the 1,3,5-trihalogeno-s-triazine (e.g. amino, acylamino, alkylamino, etc.) through the condensation with chloranil and the ring-closure similar to those described above, if necessary, followed by sulfonation.

The dioxazine compound (I) in accordance with the present invention is fiber-reactive and useful for dyeing or printing hydroxyl group-containing and amide group-containing materials. The materials are favorably in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose stable and filament viscose. Examples of the cellulose-containing fiber materials are mixed fiber materials such as cellulose/polyester, cellulose/wool, cellulose/acryl and the like.

The amido group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural of synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzene-sulfonic acid or aminonaphthalenesulfonic acid, or an addition product between stearylamine and ethylene oxide, and the like.

The present dioxazine compound (I) can be characterized be excellent dye performances in the dyeing and printing of fiber materials, particularly cellulose fiber materials. For example, the compound can give a dyed product excellent in light fastness, perspiration-light fastness, wet fastness such as washing resistance, peroxide-washing resistance, perspiration resistance and acid-hydrolysis resistance, and alkali fastness, chlorine fastness, abrasion fastness and iron fastness. The dioxazine compound (I) can also exhibit excellent build-up, level-dyeing and wash-off properties and high solubility as well as high exhaustion and fixation percentages. Moreover, the dioxazine compound (I) can hardly be affected by changes in a dyeing temperature and dyeing bath ratio, so that a dyed product with a constant quality can be obtained with superior reproducibility.

Moreover, the dioxazine compound (I) can be characterized in properties such that the compound (I) is hard to change in its quality even when brought into contact with a basic substance during storage, and products dyed or printed with the compound (I) are hard to change in their color even when they are subjected to fix-treatment or resin-finishing.

The present invention is illustrated in more detail with reference to the following Examples, which are only illustrative, but not limitative. In Examples, parts and % are by weight.

EXAMPLE 1

A starting dioxazine compound (18.1 parts) of the following formula,

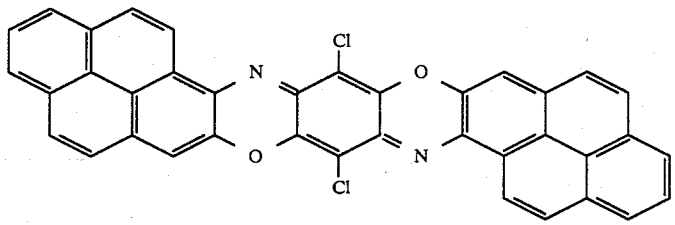

was added gradually to chlorosulfonic acid (69.9 parts) at a temperature of below 40° C., and the mixture was gradually heated to 100° and kept for 10 hours at this temperature. To the reaction mixture cooled to 50° C. was dropwise added thionyl chloride (14.3 parts) at a temperature of between 60° and 70° C., and the mixture was heated to 100° C., kept for 1 hour at this temperature and then cooled to 40° C. The reaction mixture was poured into a mixture of water (120 parts) and ice (330 parts) to deposit crystals. The crystals collected on a suction filter were washed with ice water (400 parts).

Whole of the crystals washed was added to a mixture of 2,5-diaminobenzenesulfonic acid (5.6 parts) and water (120 parts), and the mixture was heated to 30° C., while controlling the pH within a range of 7 to 8 using a 28% sodium hydroxide solution. Thereafter, the reaction mixture was adjusted to pH 4 to 5 using hydrochloric acid, and then suction-filtered.

The cake on the suction filter was mixed with water (100 parts) to form a slurry. The slurry was cooled to 0° to 5° C. by the addition of ice and mixed with cyanuric chloride (5.5 parts). The mixture was kept at a pH ranging from 4 to 4.5 using a 15% sodium carbonate solution. Then, 1-aminobenzene-3-β-sulfatoethylsulfone (7.6 parts) was added to the reaction mixture, and the resulting mixture was heated to 30° C., while controlling the pH within a range of 5 to 6 using a 15% sodium carbonate solution, and kept at this temperature to complete the reaction. The reaction mixture was mixed with sodium chloride. The resulting precipitate was collected on a suction filter, and then dried at 60° C. to obtain a dioxazine compound of the following formula.

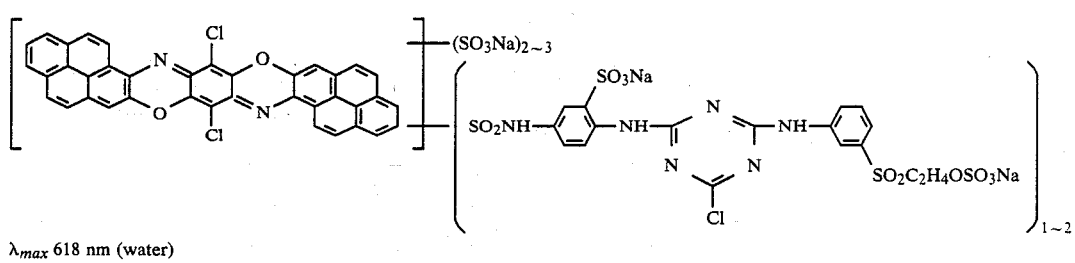

$\lambda_{max}$ 618 nm (water)

EXAMPLES 2 to 22

In a manner similar to that of Example 1, an intermediate dioxazine compound (IX) shown in a second column of the following table was prepared, and using this compound, Example 1 was repeated, provided that an aromatic amine compound (IV) shown in a third column of the following table was used in place of 1-aminobenzene-3-β-sulfatoethylsulfone, whereby the corresponding dioxazine compound giving a color shown in a fourth column was obtained.

| Example No. | Intermediate dioxazine compound of the formula (IX) | Aromatic amine compound of the formula (IV) | Color on cotton |
|---|---|---|---|
| 2 | Pyrene-fused dioxazine with Cl substituents, bearing $[(SO_3H)_{2\sim3}]$ and $[-SO_2NH-C_6H_3(SO_3H)(NH_2)]_{1\sim2}$ substituents | 4-amino-2-(β-sulfatoethylsulfonyl)anisole ($H_2N$—, $OCH_3$, $SO_2C_2H_4OSO_3H$) | Blue |
| 3 | " | 3-amino-4-methoxyphenyl β-sulfatoethyl sulfone ($OCH_3$, $H_2N$, $SO_2C_2H_4OSO_3H$) | " |
| 4 | " | 4-aminophenyl β-sulfatoethyl sulfone ($H_2N$—C$_6$H$_4$—$SO_2C_2H_4OSO_3H$) | " |
| 5 | Pyrene-fused dioxazine with Cl substituents, bearing $[(SO_3H)_{2\sim3}]$ and $[-SO_2NH-C_6H_3(SO_3H)(NH_2)]_{1\sim2}$ substituents | 6-amino-2-(β-sulfatoethylsulfonyl)naphthalene ($H_2N$-naphthyl-$SO_2C_2H_4OSO_3H$) | Blue |

| Example No. | Intermediate dioxazine compound of the formula (IX) | Aromatic amine compound of the formula (IV) | Color on cotton |
|---|---|---|---|
| 6 | Pyrene-fused dioxazine with Cl, Cl; $-(SO_3H)_{2\sim3}$; $\{-SO_2NH-\text{(benzene with }SO_3H, NH_2, OCH_3)\}_{1\sim2}$ | $H_2N-C_6H_4-SO_2C_2H_4OSO_3H$ (para) | " |
| 7 | " | $H_2N-C_6H_4-SO_2C_2H_4Cl$ (meta) | " |
| 8 | Pyrene-fused dioxazine with Cl, Cl; $-(SO_3H)_{2\sim3}$; $\{-SO_2NH-\text{(benzene with }SO_3H, NH_2)\}_{1\sim2}$ | $H_2N-C_6H_4-SO_2C_2H_4OSO_3H$ (meta) | " |
| 9 | Pyrene-fused dioxazine with Cl, Cl; $-(SO_3H)_{2\sim3}$; $\{-SO_2NH-\text{(benzene with }SO_3H, NH_2)\}_{1\sim2}$ | $H_2N-C_6H_4-SO_2C_2H_4OCOCH_3$ (para) | Blue |

-continued

| Example No. | Intermediate dioxazine compound of the formula (IX) | Aromatic amine compound of the formula (IV) | Color on cotton |
|---|---|---|---|
| 10 | | H₂N–C₆H₄–SO₂C₂H₄OPO₃H₂ (para) | " |
| 11 | dioxazine with (SO₃H)₂₋₃ and (SO₂NH–C₆H₂(SO₃H)₂(NH₂))₁₋₂ substituents | H₂N–C₆H₄–SO₂C₂H₄OSO₃H (meta) | " |
| 12 | dioxazine with (SO₃H)₂₋₃ and (SO₂NH–C₆H₄(NH₂))₁₋₂ substituents | 2-H₂N-4-SO₂CH=CH₂-1-SO₃H–C₆H₃ | " |
| 13 | dioxazine with (SO₃H)₂₋₃ and (SO₂NHC₂H₄NH₂)₁₋₂ substituents | H₂N–C₆H₄–SO₂C₂H₄OSO₃H (meta) | Blue |

-continued
| Example No. | Intermediate dioxazine compound of the formula (IX) | Aromatic amine compound of the formula (IV) | Color on cotton |
|---|---|---|---|
| 14 | 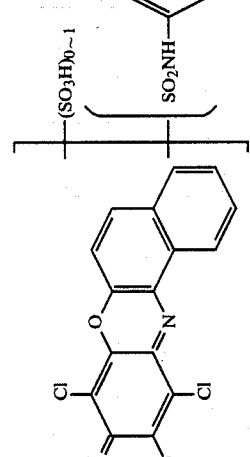 | 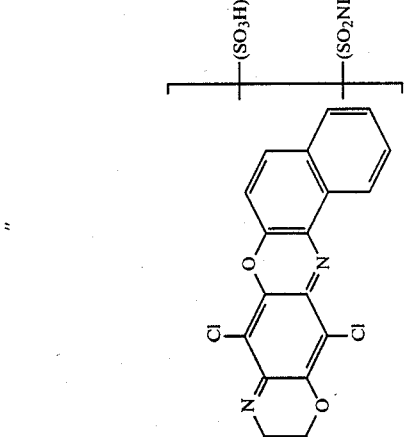 | Red |
| 15 | 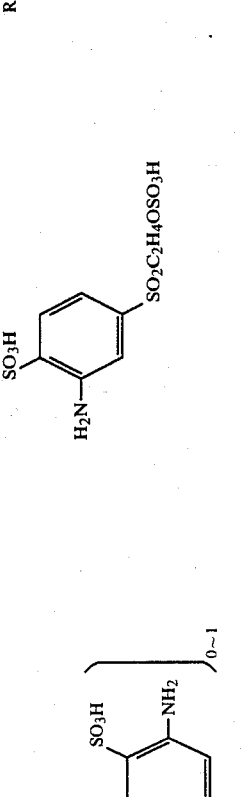 | | " |
| 16 | 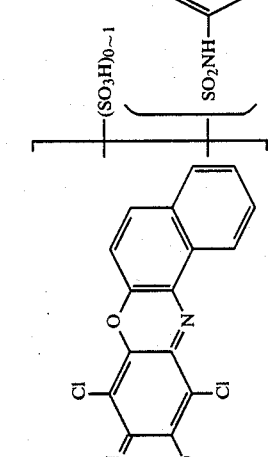 | 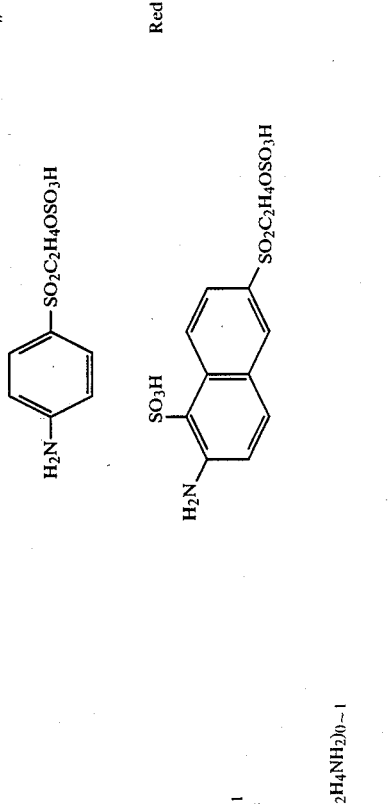 | " |
| 17 |  | 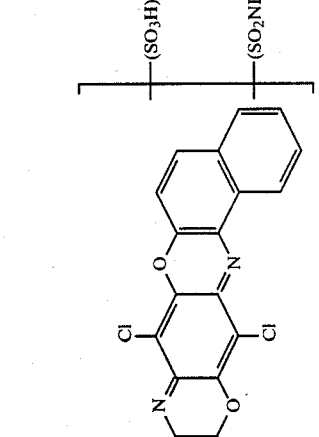 | Red |

-continued
| Example No. | Intermediate dioxazine compound of the formula (IX) | Aromatic amine compound of the formula (IV) | Color on cotton |
|---|---|---|---|
| 18 | 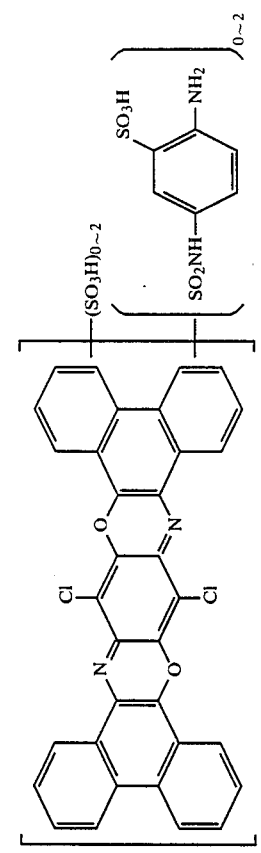 | 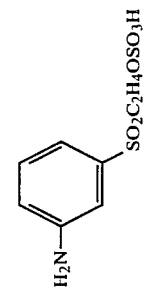 | Reddish blue |
| 19 | " | 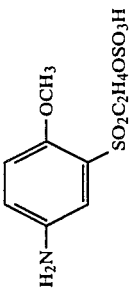 | " |
| 20 | 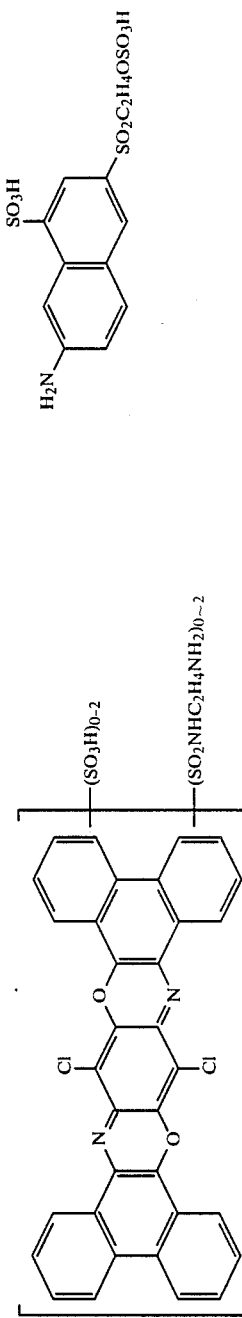 | | " |

-continued

| Example No. | Intermediate dioxazine compound of the formula (IX) | Aromatic amine compound of the formula (IV) | Color on cotton |
|---|---|---|---|
| 21 | dioxazine structure with $(SO_3H)_{0~2}$ and $\{SO_3NH$—phenyl($SO_3H$)$NH_2\}_{0~1}$ | phenyl with $H_2N$, $OCH_3$, $SO_2C_2H_4OSO_3H$ | Reddish blue |
| 22 | dioxazine structure with $(SO_3H)_{0~3}$ and $\{SO_2NH$—phenyl($SO_3H$)$_2$$NH_2\}_{0~2}$ | phenyl with $H_2N$, $SO_2CH=CH_2$ | Greenish blue |

EXAMPLE 23

The dioxazine compound obtained in Example 1 (each 0.1, 0.3 and 0.6 part) was dissolved in water (200 parts), and sodium sulfate (10 parts) and cotton (10 parts) were added to the solution. The bath was heated to 60° C. and then sodium carbonate (4 parts) was added thereto. Dyeing was continued for 1 hour at that temperature. The cotton was washed with water, soaped, washed again with water and then dried to obtain each dyed product of a blue color excellent in fastness properties, particularly chlorine fastness, light fastness and perspiration-light fastness with extremely high build-up property.

The dioxazine compound was found to have a high water-solubility and show a good level-dyeing property and reproducibility on the dyeing.

EXAMPLE 24

Each dioxazine compound (0.3 part) obtained in Examples 2 to 22 was dissolved in water (200 parts), and cotton (10 parts) was added to the solution. The bath was heated to 50° C., and 30 minutes thereafter, sodium carbonate (4 parts) was added thereto. Dyeing was carried out for 1 hour at that temperature. Thereafter, the cotton was washed with water, soaped, washed again with water and dried to obtain each dyed product of a color as shown in the above excellent in fastness properties, particularly chlorine fastness, light fastness and perspiration-light fastness, with a high build-up property.

EXAMPLE 25

To a suspension of cyanuric chloride (5.5 parts) in water (200 parts) was dropwise added over 1 hour 1-N-ethylaminobenzene-4-β-sulfatoethylsulfone (9.8 parts) at a temperature of 5° to 10° C., while controlling the pH within a range of 3 to 4 using a 15% sodium carbonate solution. To this reaction mixture was added the intermediate dioxazine compound (31.5 parts) of the following formula, which had been obtained in a manner similar to that of Example 1,

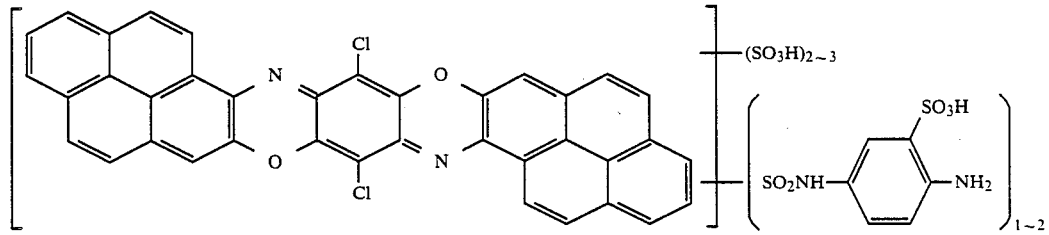

and the mixture was heated to a temperature of between 40° and 50° C., while controlling the pH within a range of 5 to 6 using a 15% sodium carbonate solution, and stirred for 10 hours at that temperature. Thereafter, the reaction mixture was mixed with sodium chloride to precipitate crystals, which were collected on a suction filter, washed and then dried at 60° C. to obtain a dioxazine compound of the following formula.

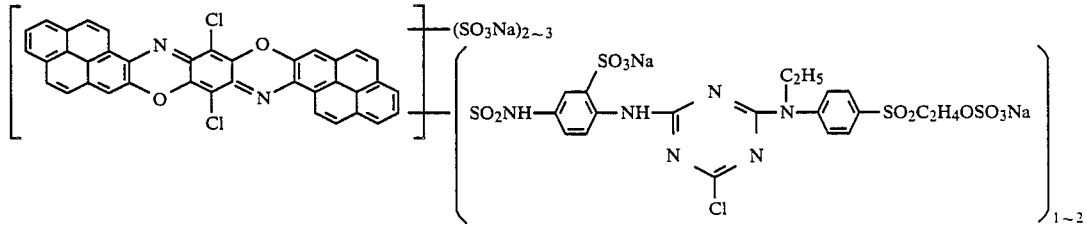

EXAMPLES 26 to 31

Example 25 was repeated, provided that an intermediate dioxazine compound (IX) shown in a second column of the following table and an aromatic amine (IV) shown in a third column were used in place of the intermediate dioxazine compound and 1-N-ethylaminobenzene-4-β-sulfatoethylsulfone used in Example 25, respectively, whereby the corresponding dioxazine compound was obtained.

| Example No. | Intermediate dioxazine compound of the formula (IX) | Aromatic amine compound of the formula (IV) | Color on cotton |
|---|---|---|---|
| 26 | Pyrene-fused dioxazine with $(SO_3H)_{2\sim3}$ and $(SO_2NH$—phenyl—$NH_2)_{1\sim2}$ | 3-(N-ethylamino)phenyl-$SO_2C_2H_4OSO_3H$ | Blue |
| 27 | Anthracene-fused dioxazine with $(SO_3H)_{0\sim2}$ and $(SO_2NHC_2H_4NH_2)_{0\sim1}$ | 4-(N-hydroxyethylamino)phenyl-$SO_2C_2H_4OSO_3H$ | Reddish blue |
| 28 | Anthracene-fused dioxazine with $(SO_3H)_{0\sim2}$ and $(SO_2NH$—(2-$NH_2$, 3-$SO_3H$)phenyl)$_{0\sim1}$ | 3-(N-acetamidoethylamino)phenyl-$SO_2C_2H_4OSO_3H$ | Reddish blue |

-continued

| Example No. | Intermediate dioxazine compound of the formula (IX) | Aromatic amine compound of the formula (IV) | Color on cotton |
|---|---|---|---|
| 29 | chrysene-fused dioxazine with $(SO_3H)_{0\sim3}$ and $-SO_2NH-$ phenyl-$SO_3H$-$NH_2$ $_{0\sim2}$ | 4-($C_2H_5$)NH-phenyl-$SO_2CH=CH_2$ | Greenish blue |
| 30 | " | 4-($C_3H_7$)NH-phenyl-$SO_2C_2H_4OSO_3H$ | Greenish blue |
| 31 | phenanthrene-fused dioxazine with $(SO_3H)_{0\sim3}$ and $-SO_2NH-$ phenyl-$NH_2$ $_{0\sim2}$ | 4-($C_2H_5$)NH-phenyl-$SO_2C_2H_4OSO_3H$ | Blue |

EXAMPLE 32

The dioxazine compound (0.3 part) obtained in Example 25 was dissolved in water (200 parts). Cotton (10

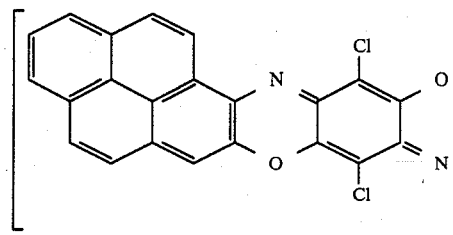

parts) was added to the solution, and the bath was heated to 50° C. 30 Minutes thereafter, sodium carbonate (4 parts) was added thereto, and dyeing was carried out for 1 hour at that temperature. Thereafter, the cotton was washed with water, soaped, washed again with water and dried to obtain a dyed product of a blue color excellent in fastness properties, particularly chlorine fastness, light fastness and perspiration-light fastness, with a high build-up property.

EXAMPLE 33

Each dioxazine compound obtained in Example 26 to 31 (each 0.1, 0.3 and 0.6 parts) was dissolved in water (200 parts). Sodium sulfate (10 parts) and cotton (10 parts) were added to the solution, and the bath was heated to 60° C. Then, sodium carbonate (4 parts) was added thereto, and dyeing was carried out for 1 hour at that temperature. Thereafter, the cotton was washed with water, soaped, washed again with water and dried to obtain each dyed product of a color as shown in the above table excellent in fastness properties, particularly chlorine fastness, light fastness and perspiration-light fastness. It was found that the dioxazine compound has a high build-up property.

The dioxazine compound was also found to have a high water-solubility and show a good level-dyeing property and reproducibility.

EXAMPLE 34

To water (100 parts) was added an intermediate dioxazine compound (31.5 parts) of the following formula,

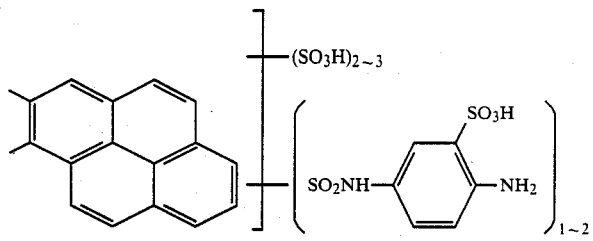

which had been prepared in a manner similar to that of Example 1, to form a slurry. The slurry was cooled to 0° to 5° C. by the addition of ice, and mixed with cyanuric chloride (5.5 parts), and the mixture was stirred to complete the reaction, while controlling the pH within a range of 4 to 4.5 using a 15% aqueous sodium carbonate solution. Then, 1-aminobenzene-3-β-sulfatoethylsulfone (7.7 parts) was added thereto, and the mixture was heated to 40° to 50° C., while controlling the pH within a range of 5 to 6 using a 15% aqueous sodium carbonate solution, and stirred for 10 hours at that temperature. Thereafter, metanilic acid (5.2 parts) was added thereto, and the mixture was heated to 90° C., while controlling the pH within a range of 4 to 4.5 using a 15% aqueous sodium carbonate solution, and stirred at that temperature to complete the reaction. The reaction mixture was cooled to 40° C. and then mixed with sodium chloride to effect a salting out. The precipitate was separated by means of a suction filter and dried at 60° C. to obtain a dioxazine compound of the following formula.

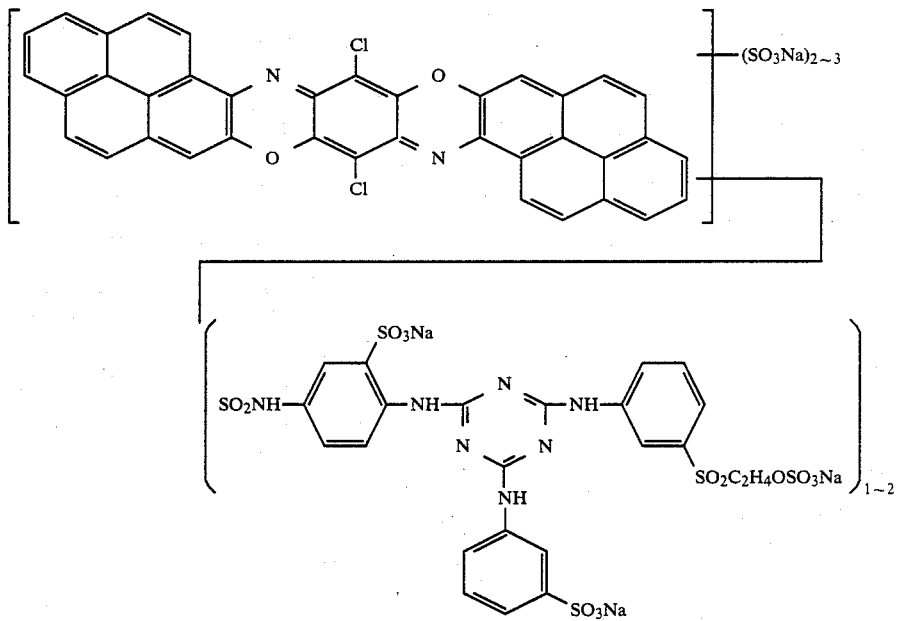

EXAMPLES 35 to 42

Example 34 was repeated, provided that an intermediate dioxazine compound (IX), an aromatic amine compound (IV) and a compound (V) shown in a second, third and fourth column of the following table, respectively, were used in place of the intermediate dioxazine compound, 1-aminobenzene-3-β-sulfatoethylsulfone and metanilic acid used in Example 34, whereby the corresponding dioxazine compound was obtained.

| Example No. | Intermediate dioxazine compound of the formula (IX) | Aromatic amine compound of the formula (IV) | Compound of the formula (V) | Color on cotton |
|---|---|---|---|---|
| 35 | Pyrene-dioxazine with –(SO₃H)₂₋₃ and –(SO₂NH–C₆H₃(SO₃H)(NH₂))₁₋₂ substituents | 3-aminophenyl–SO₂C₂H₄–OSO₃H | 2,5-diaminobenzene-1,4-disulfonic acid (H₂N, SO₃H, SO₃H) | Blue |
| 36 | " | " | 4-amino-naphthalene-1,5-disulfonic acid | " |
| 37 | " | " | nicotinic acid (pyridine-3-COOH) | " |
| 38 | " | " | 4-chloroaniline | " |

-continued
| Example No. | Intermediate dioxazine compound of the formula (IX) | Aromatic amine compound of the formula (IV) | Compound of the formula (V) | Color on cotton |
|---|---|---|---|---|
| 39 |  | H₂N—⟨benzene, SO₃H, SO₂C₂H₄OSO₃H⟩ | H₂NC₂H₄SO₃H | Reddish blue |
| 40 |  | H₂N—⟨benzene, OCH₃, SO₂C₂H₄OSO₃H⟩ | HO—⟨benzene⟩—SO₃H | Reddish blue |

-continued

| Example No. | Intermediate dioxazine compound of the formula (IX) | Aromatic amine compound of the formula (IV) | Compound of the formula (V) | Color on cotton |
|---|---|---|---|---|
| 41 | dioxazine with dibenzo[a,h]anthracene-type fused ring systems, $(SO_3H)_{0-3}$, $SO_2NH$— attached to benzene ring bearing $SO_3H$, $NH_2$, $OCH_3$, $(SO_2NH—)_{0-2}$ | 7-amino-4-sulfo-3-(β-sulfatoethylsulfonyl)naphthalene ($H_2N$–naphthalene with $SO_3H$, $SO_2C_2H_4$–$OSO_3H$) | 3-aminobenzoic acid ($H_2N$–C$_6$H$_4$–COOH) | Greenish blue |
| 42 | dioxazine with naphthalene fused ring systems, $(SO_3H)_{0-1}$, $SO_2NH$— attached to benzene ring bearing $NH_2$, $SO_3H$ (×2), $(SO_2NH—)_{0-1}$ | 2-amino-4-(β-sulfatoethylsulfonyl)-1-methoxybenzene ($OCH_3$, $H_2N$, $SO_2C_2H_4$–$OSO_3H$) | 2-amino-1,4-benzenedisulfonic acid ($SO_3H$, $H_2N$, $SO_3H$) | Red |

EXAMPLE 43

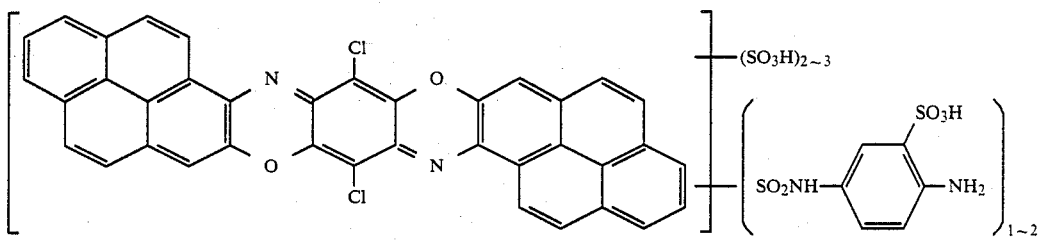

Using the dioxazine compound (each 0.1, 0.3 and 0.6 part) obtained in Example 34, dyeing was carried out in a manner similar to that of Example 23 to obtain each dyed product of a blue color excellent in fastness properties, particularly chlorine, light and perspiration-light fastness. The dioxazine compound was found to have a high build-up and water-solubility and show a good level dyeing property and reproducibility on the dyeing.

EXAMPLE 44

Using each dioxazine compound (0.3 part) obtained in Examples 35 to 42, dyeing was carried out in a manner similar to that of Example 24, to obtain each dyed product of a color as shown in the above table excellent in fastness properties, particularly chlorine, light and perspiration-light fastness with a high build-up property.

EXAMPLE 45

To a suspension of cyanuric chloride (5.5 parts) in water (200 parts) was dropwise added at 5° to 10° C. over 1 hour an aqueous solution of 1-N-ethylaminobenzene-4-β-sulfatoethylsulfone (9.8 parts), while controlling the pH within a range of 3 to 4 using a 15% aqueous solution of sodium carbonate, and the mixture was stirred for 3 hours. The intermediate dioxazine compound (31.5 parts) of the following formula, which had been obtained in a manner similar to that of Example 1, was added to the above reaction mixture, and the resulting mixture was heated to 40° to 50° C., while controlling the pH within a range of 5 to 6 using a 15% aqueous solution of sodium carbonate, and stirred for 10 hours at that temperature. Metanilic acid (5.2 parts) was added thereto, and the mixture was heated to 90° to 95° C., while controlling the pH within a range of 4 to 4.5 using a 15% aqueous solution of sodium carbonate, and kept at that temperature to complete the reaction. The reaction mixture was cooled to 40° C. and then subjected to salting out with sodium chloride. The precipitate was collected on a suction filter and dried at 60° C. to obtain a dioxazine compound of the following formula.

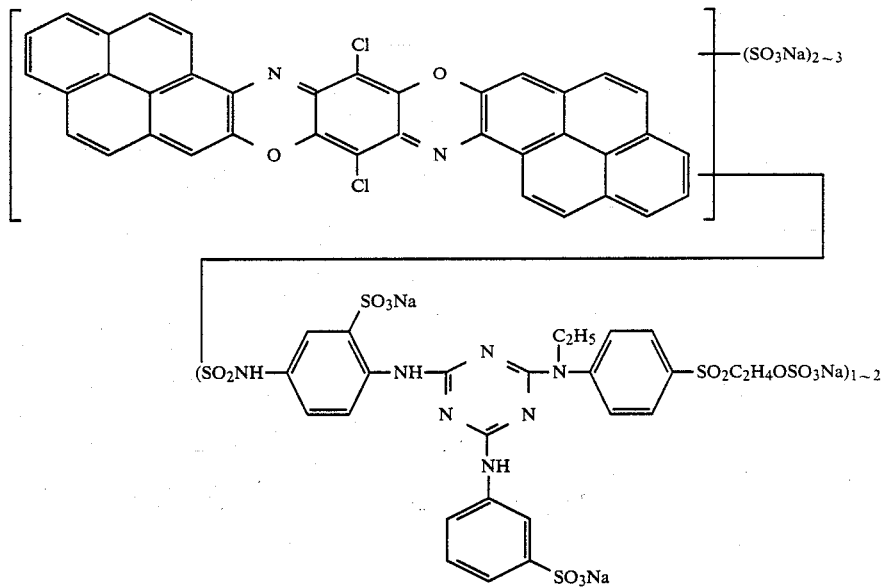

EXAMPLES 46 to 49

Example 45 was repeated, provided that an intermediate dioxazine compound (IX), an aromatic amine compound (IV) and a compound (V) were used in place of the intermediate compound, 1-N-ethylaminobenzene-4-β-sulfatoethylsulfone and metanilic acid used in Example 45, respectively, thereby obtaining the corresponding dioxazine compound.

| Example No. | Intermediate dioxazine compound of the formula (IX) | Aromatic amine compound of the formula (IV) | Compound of the formula (V) | Color on cotton |
|---|---|---|---|---|
| 46 | Pyrene-dioxazine-pyrene with (SO₃H)₂₋₃ on one side and (SO₂NH-Ar) where Ar = aminobenzene with (SO₃H)₁₋₂ | 3-(N-ethylamino)phenyl-SO₂C₂H₄OSO₃H | aniline (H₂N-C₆H₅) | Blue |
| 47 | Naphthalene-dioxazine-naphthalene with (SO₃H)₀₋₁ and (SO₂NH-Ar) where Ar = aminobenzene with SO₃H and (NH₂)₀₋₁ | 4-(N-propylamino)phenyl-SO₂C₂H₄OSO₃H | 3-aminobenzenesulfonic acid | Red |
| 48 | Naphthalene-dioxazine-naphthalene with (SO₃H)₀₋₁, OCH₃ and (SO₂NH-Ar) where Ar has SO₃H and (NH₂)₀₋₁ | 4-(N-ethylamino)phenyl-SO₂C₂H₄OSO₃H | $H_2NC_2H_4COOH$ | " |

-continued

| Example No. | Intermediate dioxazine compound of the formula (IX) | Aromatic amine compound of the formula (IV) | Compound of the formula (V) | Color on cotton |
|---|---|---|---|---|
| 49 | ![structure with (SO$_3$H)$_{0\sim3}$ and (SO$_2$NHC$_2$H$_4$NH$_2$)$_{0\sim2}$ substituents on bis-naphtho dioxazine] | HN(C$_2$H$_4$OH)–C$_6$H$_4$–SO$_2$C$_2$H$_4$OSO$_3$H | H$_2$NC$_2$H$_4$OH | Greenish blue |

EXAMPLE 50

Using the dioxazine compound obtained in Example 45 dyeing was carried out in a manner similar to that of Example 24 to obtain a dyed product of a blue color excellent in fastness properties, particularly chlorine, light and perspiration-light fastness with high build-up property.

EXAMPLE 51

Using the dioxazine compounds obtained Examples 46 to 49, dyeing was carried out in a manner similar to that of Example 23 to obtain each dyed product of a color as shown in the above table excellent in fastness properties, particularly chlorine, light and perspiration-light fastness.

Those compounds were found to have high solubility and exhibit a good level dyeing property and high reproducibility on the dyeing.

EXAMPLE 52

An intermediate dioxazine compound (31.5 parts) of the following formula, and cyanuric chloride (5.5 parts) was added thereto. The mixture was kept at pH 4 to 4.5 using a 15% aqueous solution of sodium carbonate to complete the reaction, and thereafter N-ethylaniline (3.6 parts) was added thereto. The mixture was heated to 40° to 50° C., while controlling the pH within a range of 5 to 6 using a 15% aqueous solution of sodium carbonate, and stirred for 10 hours at that temperature. Thereafter, 1-aminobenzene-3-β-sulfatoethylsulfone (7.6 parts) was added thereto, and the mixture was heated to 90° to 95° C., while controlling the pH within a range of 4 to 4.5 using a 15% aqueous solution of sodium carbonate, and kept at that temperature to complete the reaction. The reaction mixture was cooled to 40° C., and subjected to salting out with sodium chloride. The precipitate was collected on a suction filter and dried at 60° C. to obtain a dioxazine compound of the following formula.

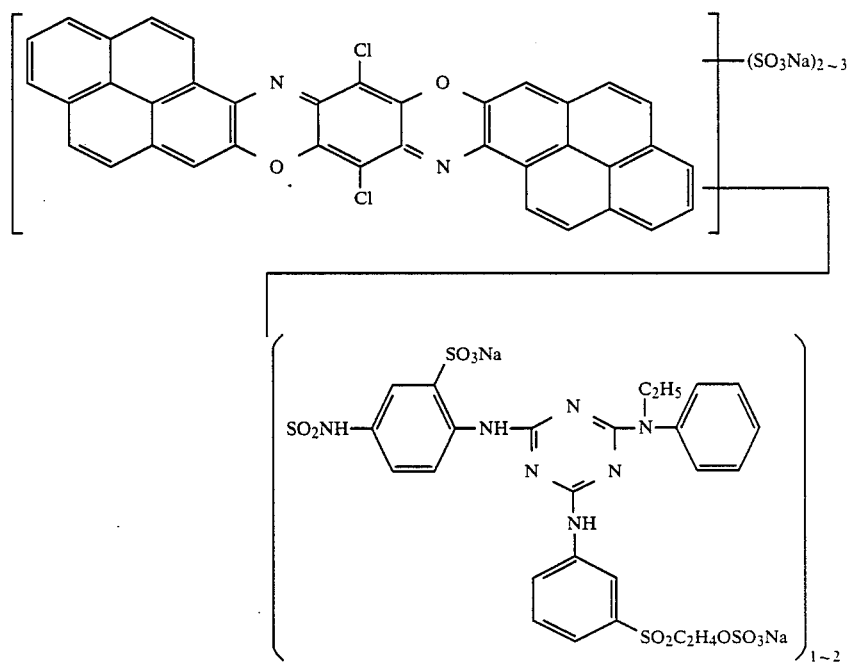

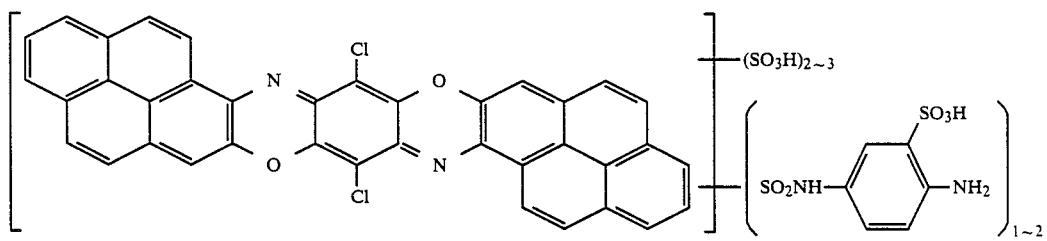

which had been obtained in a manner similar to that of Example 1, was added to water (100 parts) to form a slurry. Ice was added to cool the slurry to 0° to 5° C.,

EXAMPLES 53 to 56

Example 52 was repeated, provided that those compounds shown in a second, third and fourth columns of the following table were used in place of the intermediate dioxazine compound, N-ethylaniline and 1-aminobenzene-3-β-sulfatoethylsulfone used in Example 52, respectively, thereby obtaining the corresponding dioxazine compound.

| Example No. | Intermediate dioxazine compound of the formula (IX) | Compound of the formula (V) | Aromatic amine compound of the formula (IV) | Color on Cotton |
|---|---|---|---|---|
| 53 | 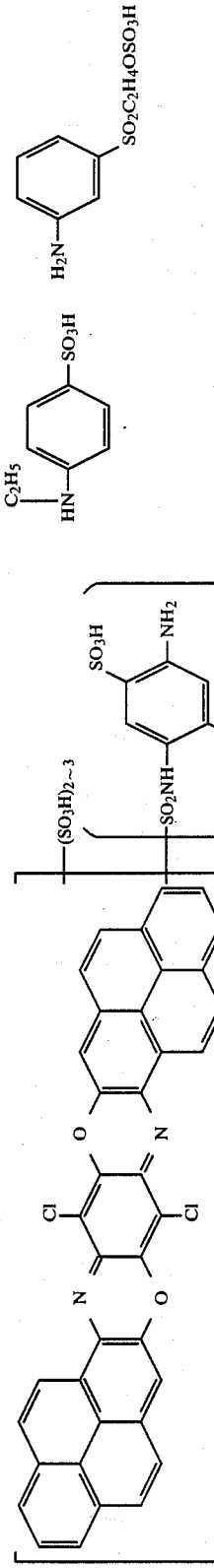 | 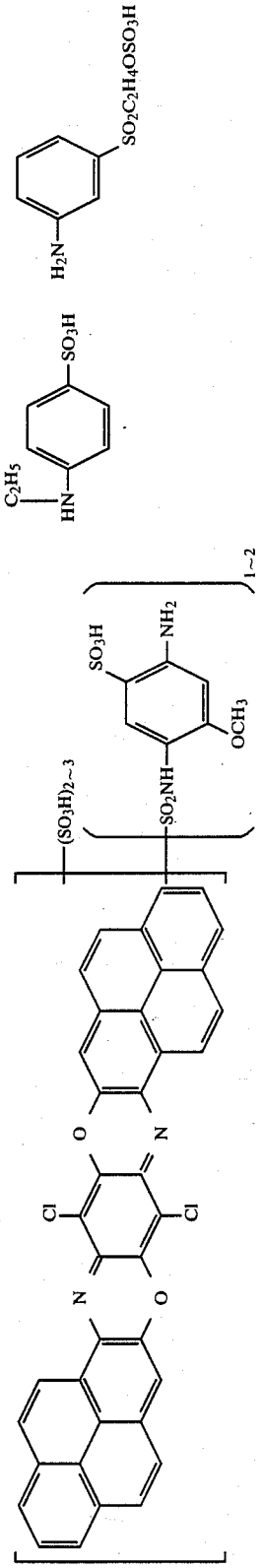 |  | Blue |
| 54 | 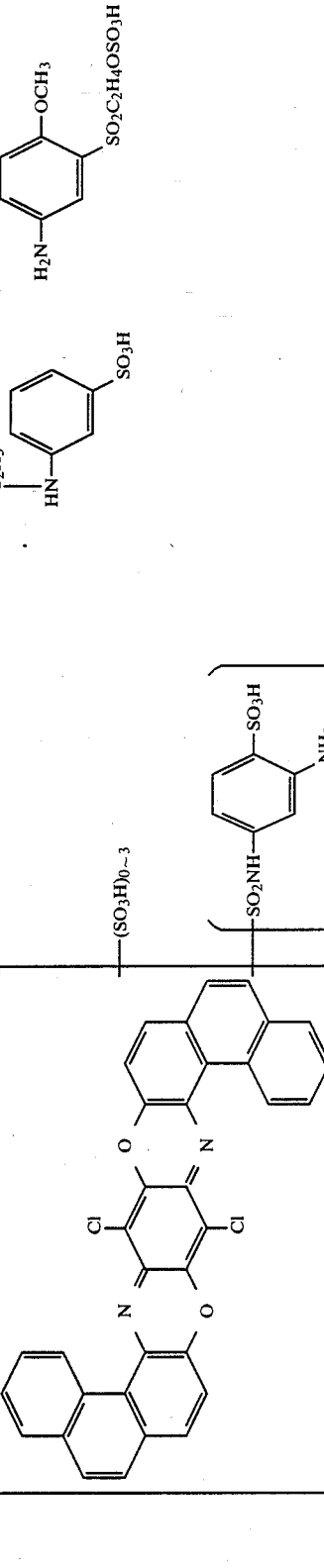 | 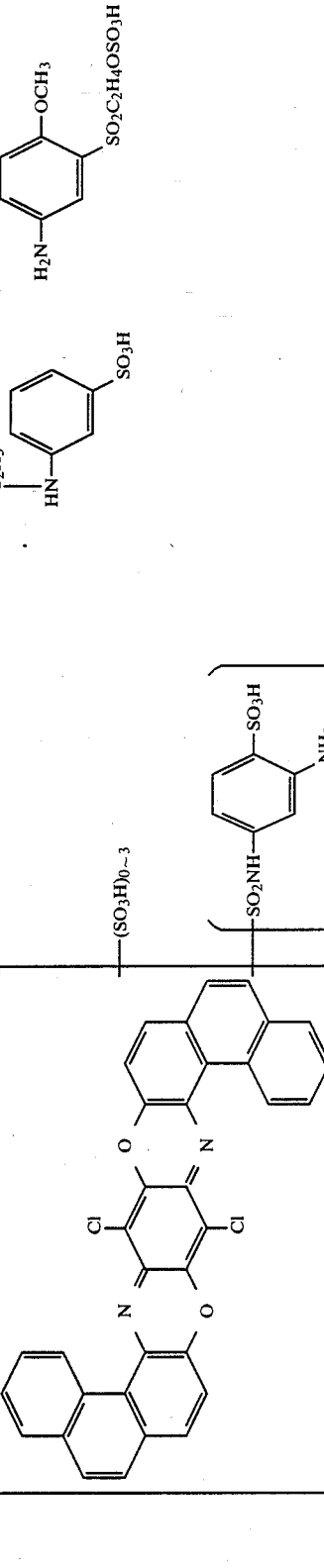 | 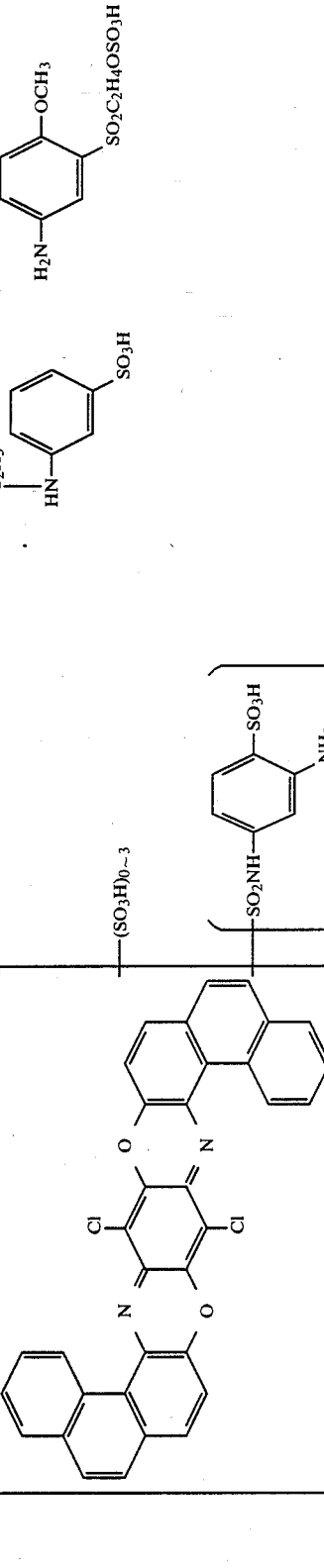 | " |

-continued

| Example No. | Intermediate dioxazine compound of the formula (IX) | Compound of the formula (V) | Aromatic amine compound of the formula (IV) | Color on Cotton |
|---|---|---|---|---|
| 55 | [dioxazine structure with anthracene groups, Cl substituents, -(SO₃H)₀₋₃ and -SO₂NH-C₆H₄-NH-C₂H₅ (SO₃H)₀₋₂ substituents] | 4-ethylamino-2-hydroxy-anisole-sulfonic acid derivative (C₂H₅HN–C₆H₃(OCH₃)(OH)–SO₃H) | 2-amino-4-(β-sulfatoethylsulfonyl)anisole (H₂N–C₆H₃(OCH₃)–SO₂C₂H₄OSO₃H) | Reddish blue |
| 56 | " | 3-aminoacetanilide (H₂N–C₆H₄–NHCOCH₃) | " | Reddish blue |

EXAMPLE 57

Using the dioxazine compound obtained in Example 52, dyeing was carried out in a manner similar to that of Example 24 to obtain a dyed product of a blue color excellent in fastness properties, particularly chlorine, light and perspiration-light fastness with a high build-up property.

EXAMPLE 58

Using each dioxazine compound obtained in Example 53 to 56, dyeing was carried out in a manner similar to that of Example 23 to obtain each dyed product of a color shown in the above table excellent in fastness properties, particularly chlorine, light and perspiration-light fastness.

Those compounds were found to have a high solubility and exhibit a good level dyeing property and reproducibility on the dyeing.

EXAMPLE 59

An intermediate dioxazine compound (31.5 parts) of the following formula, and cyanuric chloride (5.5 parts) was added thereto. The mixture was kept at pH 4 to 4.5 using a 15% aqueous solution of sodium carbonate to complete the reaction. Successively, aqueous ammonia was added to keep the mixture at pH 8 to 9 for a sufficient time to complete the reaction, during which the mixture was kept at 25° to 30° C. 5% Hydrochloric acid was added to adjust the pH of the reaction mixture within a range of 4 to 5, and thereafter 1-aminobenzene-3-$\beta$-sulfatoethylsulfone (7.6 parts) was added thereto. The mixture was heated to 90° to 95° C., while controlling the pH within a range of 4 to 4.5 using a 15% aqueous solution of sodium carbonate, and kept at that temperature to complete the reaction. The reaction mixture was cooled to 40° C. and subjected to salting out. The precipitate was collected on a suction filter and dried at 60° C. to obtain a dioxazine compound of the following formula.

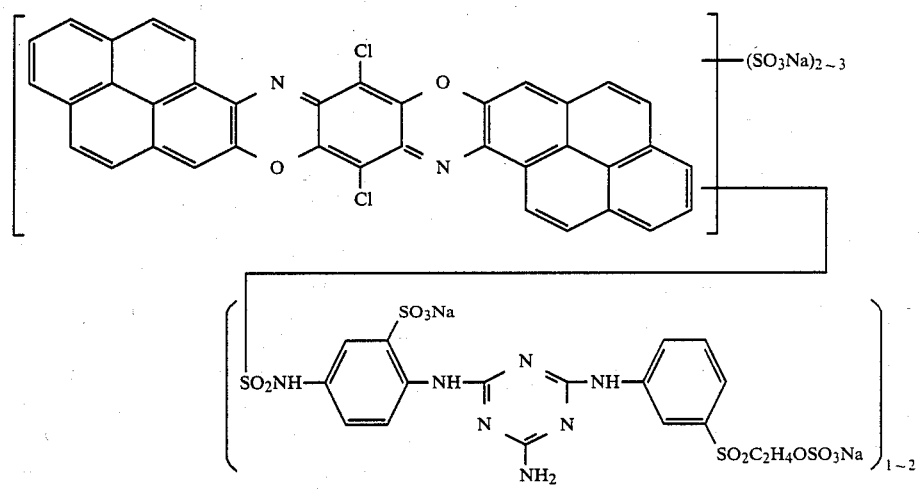

EXAMPLE 60 to 67

Example 59 was repeated, provided that those shown in a second, third and fourth columns of the following table were used in place of the intermediate compound, ammonia and 1-aminobenzene-3-$\beta$-sulfatoethylsulfone used in Example 59, respectively, thereby obtaining the corresponding dioxazine compound.

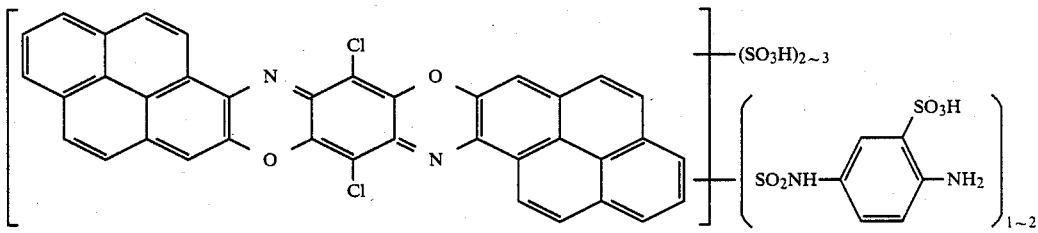

which had been prepared in a manner similar to that of Example 1, was mixed with water (100 parts) to form a slurry. Ice was added to cool the slurry to 0° to 5° C.,

| Example No. | Intermediate dioxazine compound of the formula (IX) | Compound of the formula (V) | Aromatic amine compound of the formula (IV) | Color on cotton |
|---|---|---|---|---|
| 60 | pyrene-dioxazine with (SO₃H)₂₋₃ and {SO₂NH—(phenyl with SO₃H, NH₂, OCH₃)}₁₋₂ | morpholine (H–N(C₂H₄)₂O) | 3-aminophenyl-SO₂C₂H₄OSO₃H | Blue |
| 61 | " | HN(C₂H₄OH)₂ | 4-amino-2-(SO₂C₂H₄OSO₃H)-anisole | " |
| 62 | phenanthrene-dioxazine with (SO₃H)₀₋₃ and {SO₂NH—(phenyl with SO₃H, NH₂)}₀₋₂ | H₂NC₂H₅ | 4-aminophenyl-SO₂C₂H₄OSO₃H | " |

-continued
| Example No. | Intermediate dioxazine compound of the formula (IX) | Compound of the formula (V) | Aromatic amine compound of the formula (IV) | Color on cotton |
|---|---|---|---|---|
| 63 | 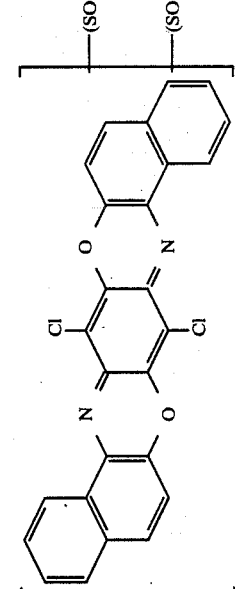 | $H-N\begin{matrix}C_2H_5\\C_2H_4OH\end{matrix}$ |  | Red |
| 64 | 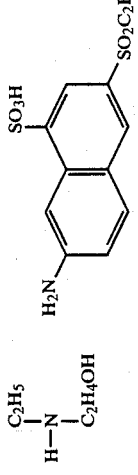 | 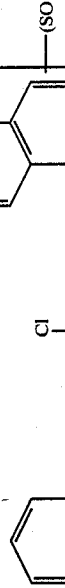 (morpholine) | 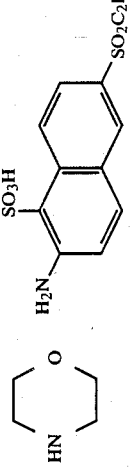 | Red |
| 65 | 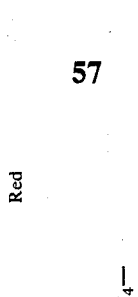 | $NH_3$ |  | Greenish blue |

-continued
| Example No. | Intermediate dioxazine compound of the formula (IX) | Compound of the formula (V) | Aromatic amine compound of the formula (IV) | Color on cotton |
|---|---|---|---|---|
| 66 | 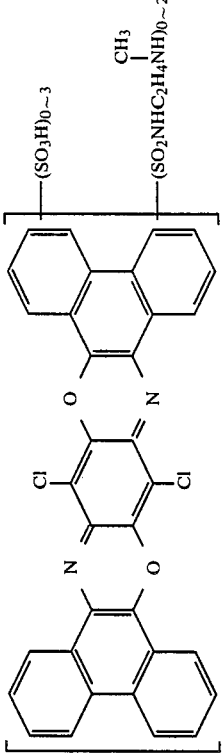 | " | " | Reddish blue |
| 67 | " | 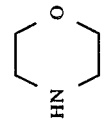 | 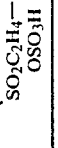 | " |

EXAMPLE 68

Using the dioxazine compound obtained in Example 59, dyeing was carried out in a manner similar to that of Example 24 to obtain a dyed product of a blue color excellent in fastness properties, particularly chlorine, light and perspiration-light fastness with a high build-up property.

EXAMPLE 69

Using each dioxazine compound obtained in Examples 60 to 67, dyeing was carried out in a manner similar to that of Example 23 to obtain each dyed product of a color shown in the abobe table excellent in fastness properties, particularly chlorine, light and perspiration-light fastness.

Each dioxazine compound was found to have a high build-up property and solubility and exhibit a good level dyeing property and reproducibility on the dyeing.

EXAMPLE 70

1-Hydroxy-3,5-dichloro-s-triazine (5.0 parts) was dispersed in water (200 parts), and an intermediate dioxazine compound (31.5 parts) of the following formula,

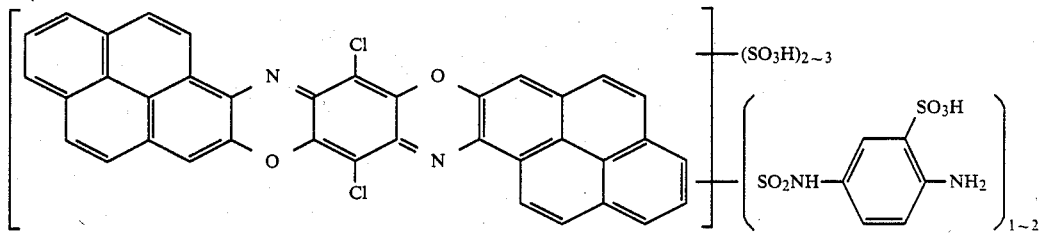

which had been prepared in a manner similar to that of Example 1, was added thereto. The mixture was adjusted to pH 4 to 5 using a 15% aqueous solution of sodium carbonate and kept at 20° to 25° C. to complete the reaction. Thereafter, 1-aminobenzene-3-$\beta$-sulfatoethylsulfone (7.6 parts) was added thereto, and the mixture was kept at 30° to 40° C. to complete the reaction, while controlling the pH within a range of 5 to 6 using a 15% aqueous solution of sodium carbonate. The reaction mixture was subjected to salting out, and the precipitate was collected on a suction filter, and dried at 60° C. to obtain a dioxazine compound of the following formula.

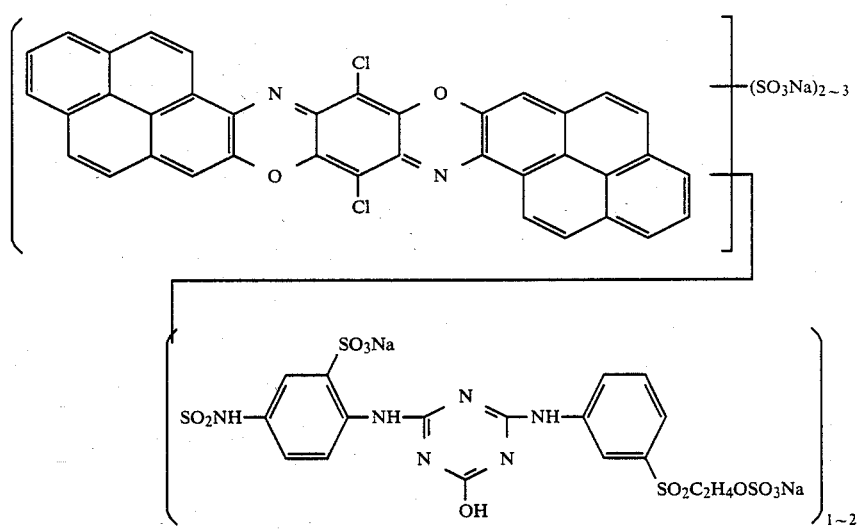

EXAMPLE 71

An intermediate dioxazine compound (31.5 parts) of the following formula,

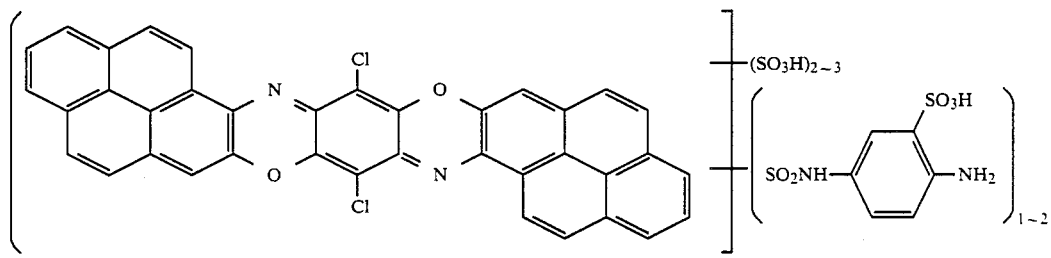

which had been prepared in a manner similar to that of Example 1, was mixed with water (100 parts) to form a slurry. Ice was added to cool the slurry to 0° to 5° C., and 1-methoxy-3,5-dichloro-s-triazine (5.4 parts) was added thereto. The mixture was kept at pH 4 to 4.5 using a 15% aqueous solution of sodium carbonate to complete the reaction. Thereafter, 1-aminobenzene-3-$\beta$-sulfatoethylsulfone (7.6 parts) was added thereto, and the mixture was kept at 40° to 50° C. to complete the reaction, while controlling the pH within a range of 5 to 6 using a 15% aqueous solution of sodium carbonate. The reaction mixture was subjected to salting out, and the precipitate was collected on a suction filter and dried at 60° C. to obtain a dioxazine compound of the following formula.

which had been prepared in a manner similar to that of Example 1, was mixed with water (100 parts) to form a slurry. Ice was added to cool the slurry to 0° to 5° C., and cyanuric chloride (5.5 parts) was added thereto. The mixture was kept at pH 4 to 4.5 using a 15% aqueous solution of sodium carbonate to complete the reaction. Thereafter, the mixture was stirred at 20° to 30° C. for 5 hours, during which sodium sulfite was added to adjust the pH within a range of 7 to 8. Thereafter, 1-aminobenzene-3-$\beta$-sulfatoethylsulfone (7.6 parts) was added thereto, and the mixture was kept at 20° to 30° C. to complete the reaction, while controlling the pH within a range of 5 to 6 using a 15% aqueous solution of sodium carbonate. The reaction mixture was subjected to salting out with sodium chloride, and the precipitate

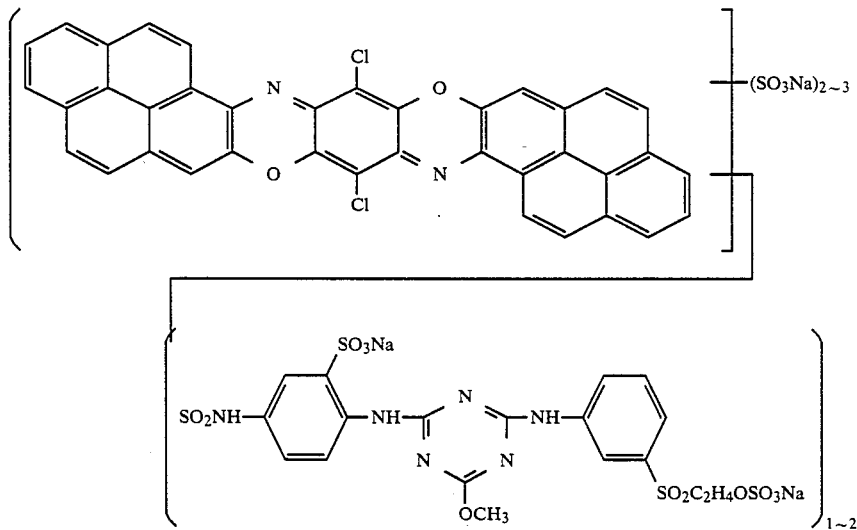

EXAMPLE 72

An intermediate dioxazine compound (31.5 parts) of the following formula, was collected on a suction filter and dried at 60° C. to obtain a dioxazine compound of the following formula.

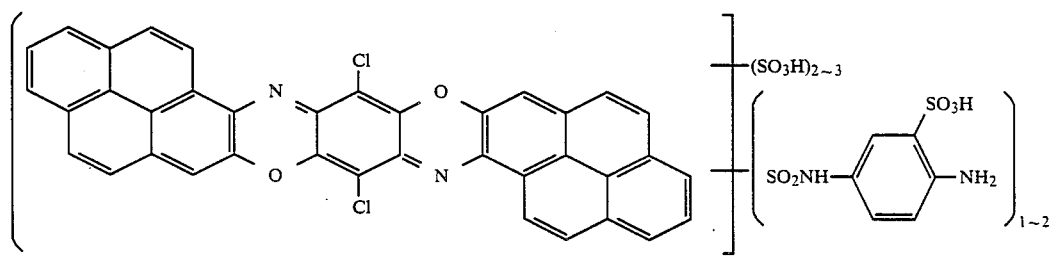

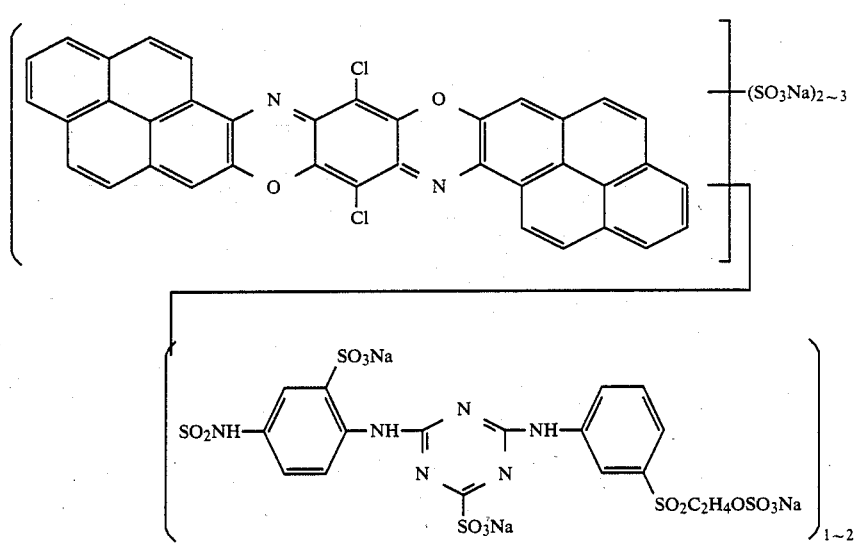
EXAMPLES 73 to 84
A manner similar to that of any one of Examples 70, 71 and 72 was repeated, provided that those described in a second and fourth column of the following table were used in place of the intermediate compound and 1-aminobenzene-3-β-sulfatoethylsulfone used in those Examples, thereby obtaining the corresponding dioxazine compound.

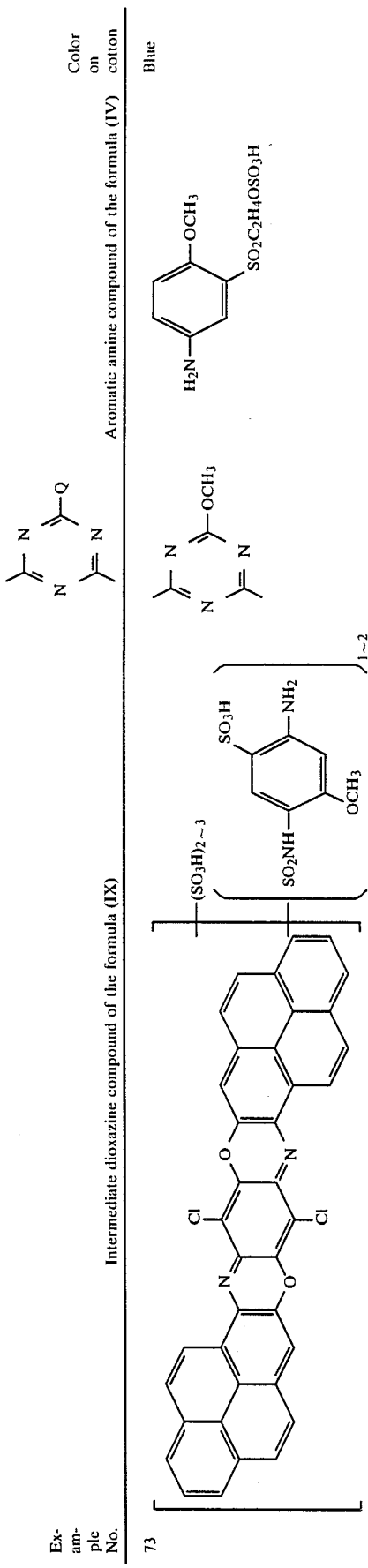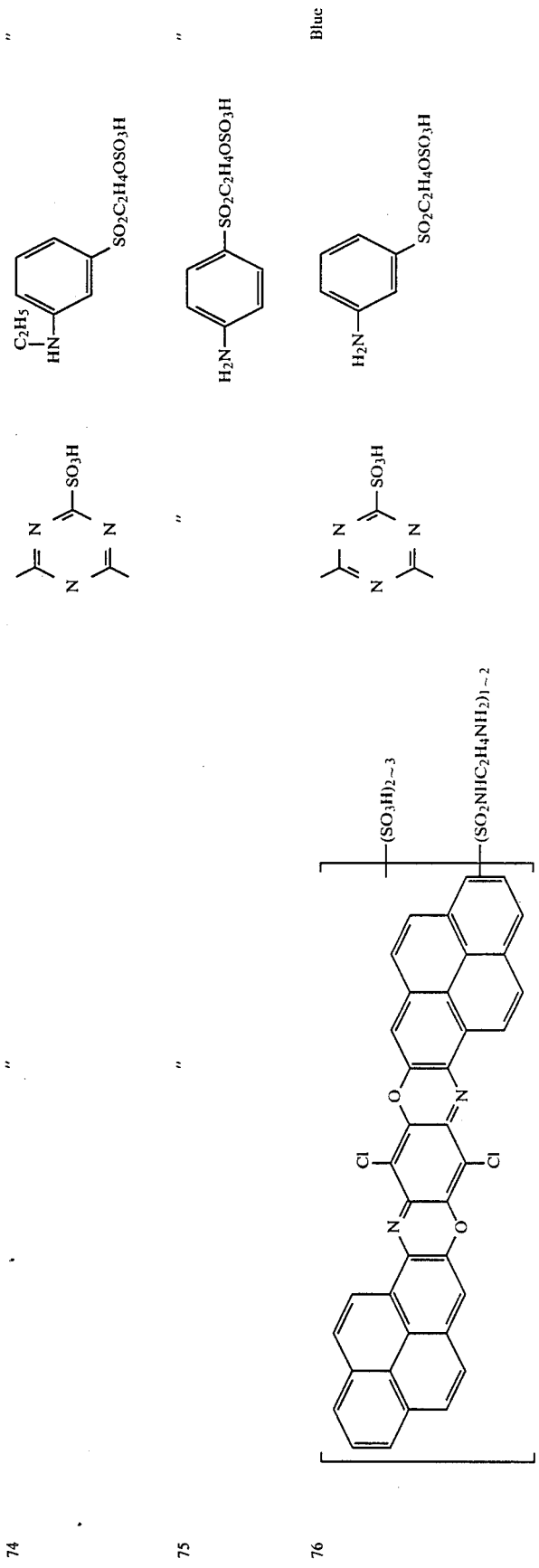

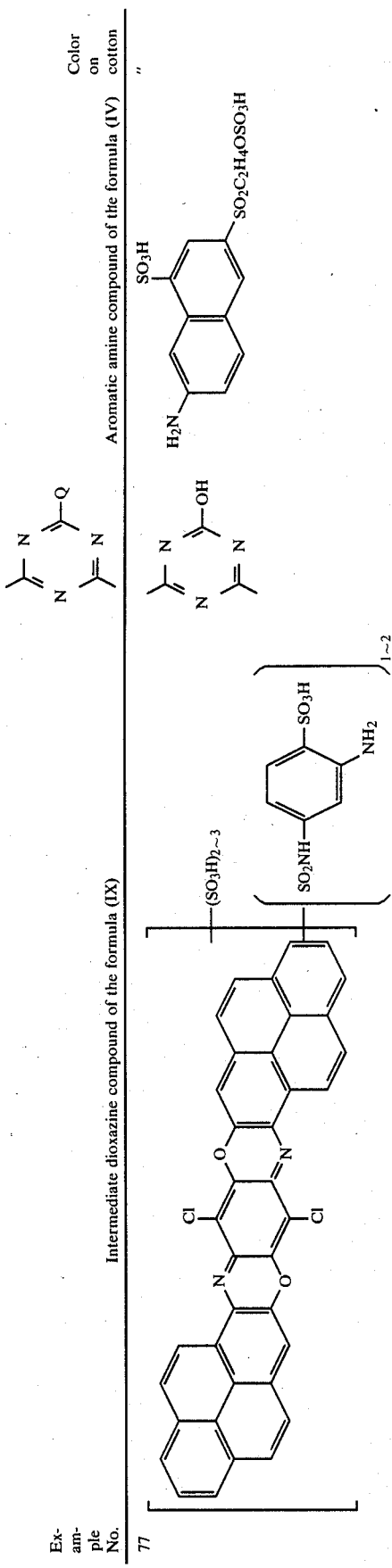
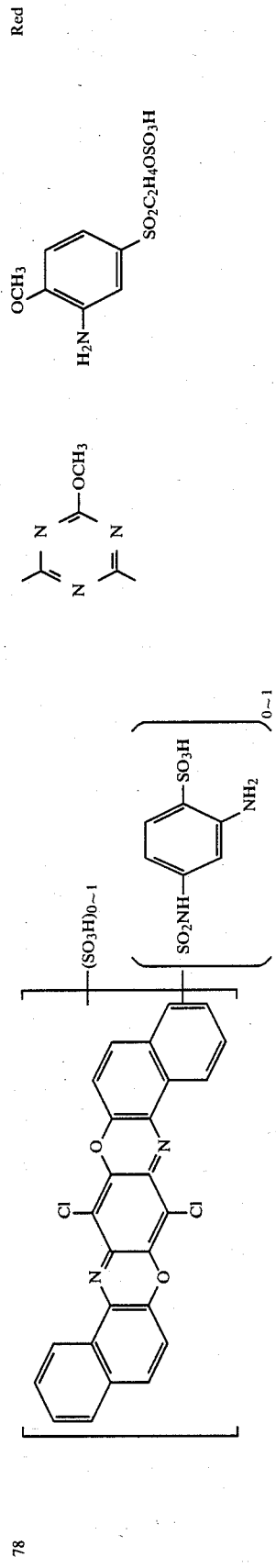
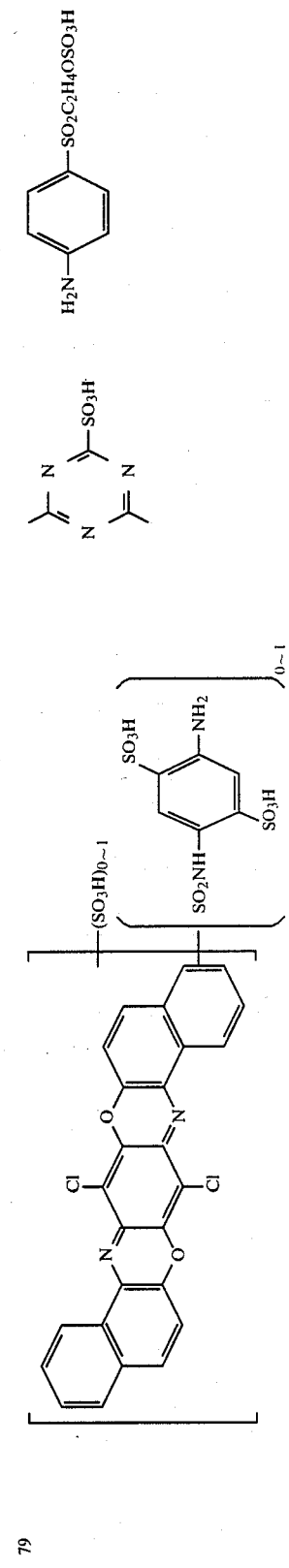

| Example No. | Intermediate dioxazine compound of the formula (IX) | | Aromatic amine compound of the formula (IV) | Color on cotton |
|---|---|---|---|---|
| 80 | | | | Red |
| 81 | | | | Reddish blue |
| 82 | | | | Greenish blue |

-continued
| Example No. | Intermediate dioxazine compound of the formula (IX) | Aromatic amine compound of the formula (IV) | Color on cotton |
|---|---|---|---|
| 83 |  |  | Greenish blue |
| 84 | " | | Reddish blue |

EXAMPLE 85

Using the dioxazine compound obtained in Example 70, dyeing was carried out in a manner similar to that of Example 23 to obtain a dyed product of a blue color excellent in fastness properties, particularly chlorine, light and perspiration-light fastness.

The compound was found to have a build-up property and solubility and exhibit a good level dyeing property and reproducibility on the dyeing.

EXAMPLE 86

Using the dioxazine compound obtained in Example 71, dyeing was carried out in a manner similar to that of Example 23 to obtain a dyed product of a blue color excellent in fastness properties, particularly chlorine, light and perspiration-light fastness with a high build-up property.

EXAMPLE 87

Using the dioxazine compound obtained in Example 72, dyeing was carried out in a manner similar to that of Example 23 to obtain a dyed product of a blue color excellent in fastness properties, particularly chlorine, light and perspiration-light fastness.

The dioxazine compound was found to have a high build-up property and solubility and exhibit a good level dyeing property and reproducibility.

EXAMPLE 88

Using each dioxazine compound obtained in Examples 73 to 84, dyeing was carried out in a manner similar to that of Example 24 to obtain each dyed product of a color shown in the above table excellent in fastness properties, particularly chlorine, light and perspiration-light fastness with high build-up property.

EXAMPLE 89

A dioxazine compound (18.1 parts) of the following formula,

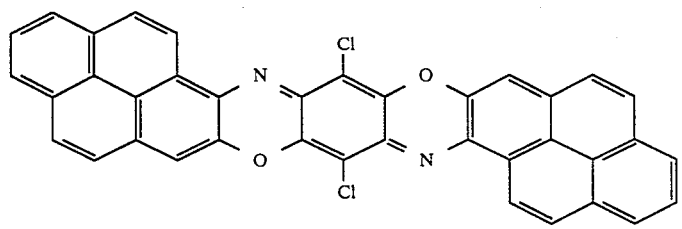

was added slowly to chlorosulfonic acid (69.9 parts) at 40° C. or below, and the mixture was heated gradually to 100° C., kept for 10 hours at this temperature and then allowed to cool to 50° C. Thionyl chloride (14.3 parts) was slowly added to the above reaction mixture at 60° to 70° C., and the mixture was heated to 100° C., kept for 1 hour at this temperature and then cooled to 40° C. The reaction mixture was poured into a mixture of water (120 parts) and ice (330 parts) to precipitate crystals, which were collected on a suction filter and washed with ice water (400 parts) to obtain a wet cake.

Meanwhile, cyanuric chloride (5.5 parts) was suspended in water (150 parts) and ice (50 parts), and 1,4-diaminobenzene-2-sulfonic acid (5.7 parts) was added to the suspension. The mixture was kept for 1 hour, while controlling the pH within a range of 2 to 3 using a 15% aqueous solution of sodium carbonate. Successively, 1-aminobenzene-3-β-sulfatoethylsulfone (7.6 parts) was added thereto, and the mixture was stirred for 3 hours at 20° to 30° C., while controlling the pH within a range of 4 to 5 using a 15% aqueous solution of sodium carbonate. To this reaction mixture was added the wet cake obtained above, and the mixture was kept for 5 hours at 40° to 50° C., while controlling the pH within a range of 5 to 6 using a 15% aqueous solution of sodium carbonate. Thereafter, the reaction mixture was subjected to salting out with sodium chloride. The precipitate was collected on a suction filter, and dried at 60° C. to obtain a dioxazine compound of the following formula.

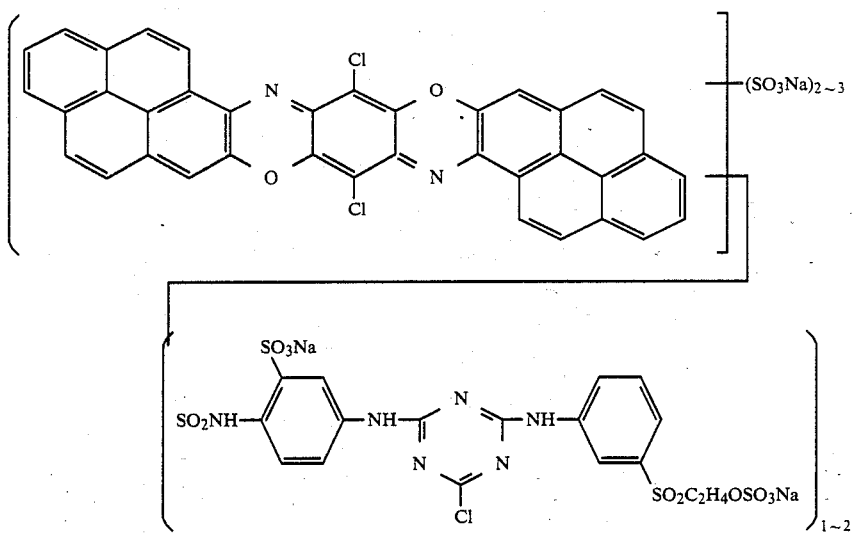

$\lambda_{max}$ 616 nm

EXAMPLE 90

Using the dioxazine obtained in Example 89, dyeing was carried out in a manner similar to that of Example 23 to obtain a dyed product of a blue color excellent in fastness properties, particularly chlorine, light and perspiration-light fastness with a high build-up property.

EXAMPLE 91

Composition of color paste

| | |
|---|---|
| Dioxazine compound obtained in Example 1 | 5 parts |
| Urea | 5 parts |
| Sodium alginate (5%) thickener | 50 parts |
| Hot water | 25 parts |
| Sodium bicarbonate | 2 parts |
| Balance (water) | 13 parts |

Mercerized cotton broad cloth was printed with a color paste of the above composition, pre-dried, steamed for 5 minutes at 100° C., rinsed with hot water, soaped, again rinsed with hot water and then dried to obtain a printed product of a blue color excellent in fastness properties.

EXAMPLE 92

1-Aminonaphthalene-4,7-disulfonic acid (91 parts) was added slowly to a 70% aqueous sodium hydroxide solution (86 parts), and the mixture was heated to 180° to 190° C., kept for 7 to 8 hours at this temperature and then poured into 30% sulfuric acid (500 parts) at 60° to 70° C. The mixture was diluted with water to make the whole 1000 parts at pH 2, stirred for 1 hour and then filtered at 55° to 60° C. to separate the precipitate, which was then washed.

The wet cake obtained was dissolved in water (300 parts) by adjusting the pH within a range of 6 to 7 using a 78% aqueous sodium hydroxide solution, and 2-chloroethylamine (21 parts) was dropwise added slowly to the solution. The mixture was kept for 2 hours at ambient temperature, while controlling the pH using a 15% aqueous sodium carbonate solution, and thereafter adjusted to pH 1 to 2 with 30% sulfuric acid to form a precipitate, which was then collected on a filter.

The precipitate obtained was dissolved in water (300 parts) by adjusting the pH within a range of 6 to 7 using a 28% aqueous sodium hydroxide solution. Into an autoclave were placed the resulting solution, a 20% aqueous ammonia (50 parts) and sulfur dioxide (17.5 parts). The mixture was allowed to react for 15 to 20 hours at 180° C. The reaction mixture cooled to 50° C. was taken out of the autoclave and adjusted to pH 2 to 3 using 30% sulfuric acid to form a precipitate, which was then collected on a filter.

The resulting precipitate (8.4 parts) and chloranil (3.7 parts) were suspended into water (100 parts), and the mixture was heated to 55° C., while adjusting to pH 6 using a 15% aqueous sodium carbonate solution, and kept for about 10 hours at that temperature. Thereafter, the reaction mixture was allowed to cool, and the precipitate collected on a filter was dried at 60° C., and then pulverized.

The powder obtained was added over 40 to 50 minutes into 25% oleum (100 parts), and the mixture was heated to 70° C. and kept for about 5 hours at this temperature. The reaction mixture was allowed to cool, then poured into ice (250 parts) and adjusted to pH 4 to 5 by slow addition of a 28% aqueous sodium hydroxide solution. The precipitate formed was separated by filtration.

The wet cake obtained was mixed with water (100 parts) and ice (20 parts), and cyanuric chloride (5.5 parts) was added thereto. The mixture was kept for 2 hours, while controlling the pH within a range of 4 to 4.5 using a 15% aqueous sodium carbonate solution. Successively, 1-aminobenzene-3-β-sulfatoethylsulfone (7.7 parts) was added thereto, and the mixture was heated to 40° to 50° C., while controlling the pH within a range of 5 to 6 using a 15% aqueous sodium carbonate solution, and kept for 5 hours at that temperature. Thereafter, the reaction mixture was subjected to salting out with sodium chloride. The precipitate was collected on a suction filtered and dried at 60° C. to obtain a dioxazine compound of the following formula.

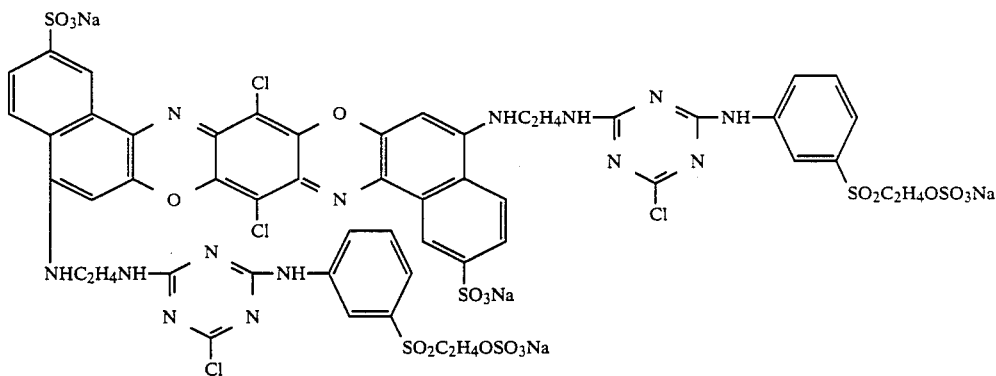

EXAMPLE 93

Using the dioxazine compound obtained in Example 92, dyeing was carried out in a manner similar to that of Example 23 to obtain a dyed product of a reddish blue color excellent in fastness properties, particularly chlorine, light and perspiration-light fastness with a high build-up property.

What is claimed is:

1. A dioxazine compound represented by the following formula (I) in a free acid form,

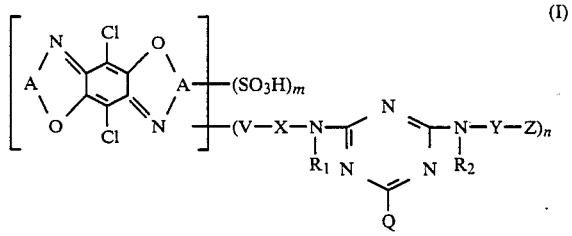

wherein A is an aromatic ring residue selected from the group consisting of:

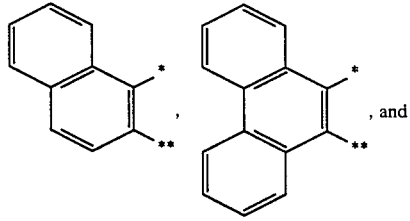, and

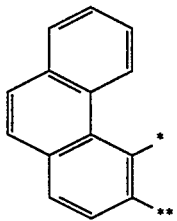

in which * and ** denote linkages to the adjacent nitrogen and oxygen atoms, respectively, V is direct linkage, $-SO_2NR_5-$ or $-NR_6-$ in which $R_5$ and $R_6$ are independently hydrogen, alkyl unsubstituted or substituted by hydroxyl, cyano, alkoxy, halogen, carboxy, carbamoyl, alkoxy carbonyl, alkyl carbonyloxy, sulfo, or sulfamoyl, X is direct linkage or aliphatic, alicyclic, araliphatic or aromatic divalent group, Y is phenylene unsubstituted or substituted once or twice by methyl, ethyl, methoxy, chloro, bromo, or sulfo, or naphthylene unsubstituted or substituted once by sulfo, Z is $-SO_2CH=CH_2$ or $-SO_2CH_2CH_2Z_1$ in which $Z_1$ is a group splittable by the action of an alkali, Q is sulfo, hydroxy, halogeno, lower alkoxy, phenoxy unsubstituted or substituted once or twice by methyl, ethyl, methoxy, chloro, bromo, sulfo or carboxy, or amino, alkylamino, cycloalkylamino, aralkylamino, arylamino, N,N-dialkylamino, N-alkyl-N-cycloalkylamino, N-alkyl-N-arylamino, heterocylic ring-containing amino or N-heterocylic ring-containing amino, $R_1$ is hydrogen, alkyl unsubstituted or substituted by hydroxyl, cyano, alkoxy, halogen, carboxy, carbamoyl, alkoxycarbonyl, alkylcarbonyloxy, sulfo, or sulfamoyl, or, when X is direct linkage and V is the $-SO_2NR_5-$, $R_1$ and $R_5$ may form a ring taken together with each adjacent nitrogen, $R_2$ is hydrogen, alkyl unsubstituted or substituted by hydroxyl, cyano, alkoxy, halogen, carboxy, carbamoyl, alkoxycarbonyl, alkylcarbonyloxy, sulfo, or sulfamoyl, and m and n satisfy the following formula, $$0 < m+n \leq 6$$

provided that m and n each is defined as follows, $$0 \leq m \leq 5 \text{ and } 0 < n \leq 4.$$

2. The dioxazine compound according to claim 1 where Q is a member selected from methoxy, ethoxy, mono- or di-sulfophenoxy, amino, alkylamino, cycloalkylamino, aralkylamino, arylamino, N,N-dialkylamino, N-alkyl-N-cycloalkylamino, N-alkyl-N-arylamino, heterocylic ring-containing amino or N-heterocylic ring-containing amino.

3. The dioxazine compound according to claim 2, wherein the unsubstituted or substituted amino is aromatic amino represented by the following formula,

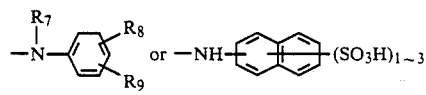

wherein $R_7$ is hydrogen, methyl or ethyl, and $R_8$ and $R_9$ are independently hydrogen, chloro, sulfo, carboxy, methyl, methoxy or ethoxy.

4. The dioxazine compound according to claim 1, wherein $R_2$ is alkyl unsubstituted or substituted by hydroxyl, cyano, alkoxy, halogen, carboxy, carbamoyl, alkoxycarbonyl, alkylcarbonyloxy, sulfo or sulfamoyl.

5. The dioxazine compound according to claim 1, wherein X is an aromatic divalent group selected from

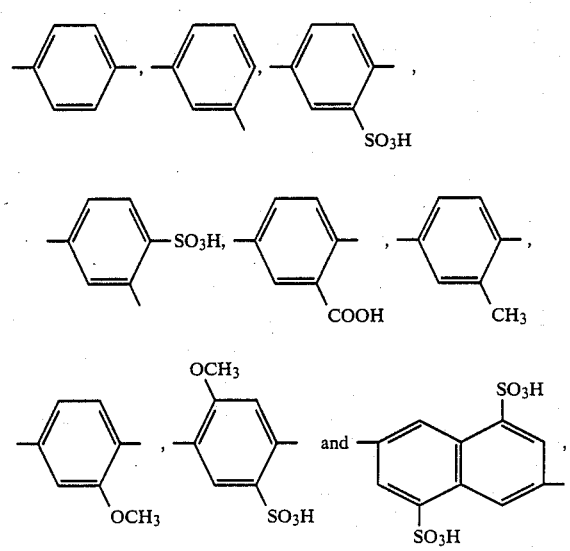

or an araliphatic divalent group selected from

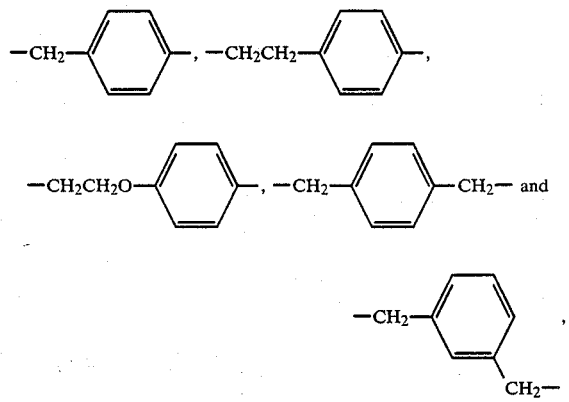

or an aliphatic or alicyclic divalent group selected from

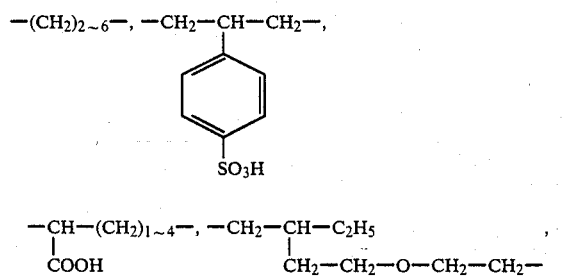

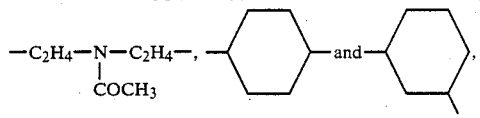

6. The dioxazine compound according to claim 1, wherein Y is a member selected from

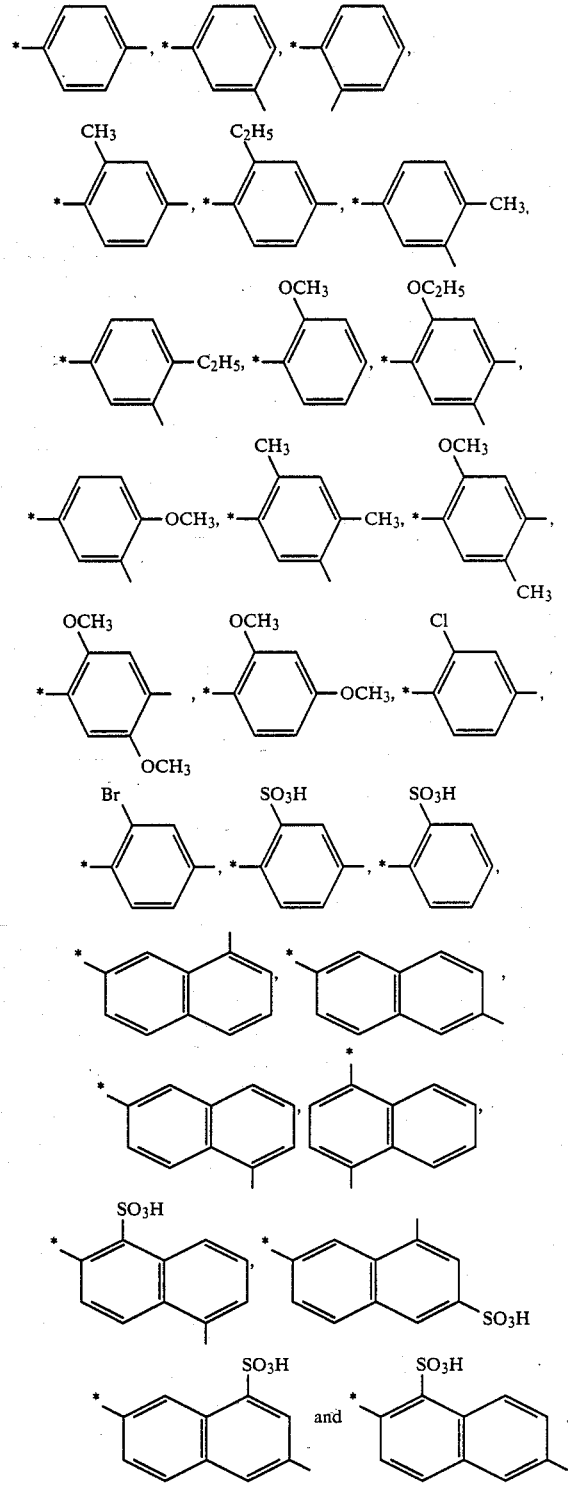

wherein * denotes a linkage to the $-NR_2-$.